(12) United States Patent
Pryor

(10) Patent No.: US 7,694,465 B2
(45) Date of Patent: Apr. 13, 2010

(54) DEPLOYABLE STRUCTURAL ASSEMBLIES, SYSTEMS FOR DEPLOYING SUCH STRUCTURAL ASSEMBLIES AND RELATED METHODS

(75) Inventor: Mark K. Pryor, San Diego, CA (US)

(73) Assignee: Alliant Techsystems Inc., Minneapolis, MN (US)

( * ) Notice: Subject to any disclaimer, the term of this patent is extended or adjusted under 35 U.S.C. 154(b) by 307 days.

(21) Appl. No.: 11/400,718

(22) Filed: Apr. 7, 2006

(65) Prior Publication Data

US 2006/0272265 A1    Dec. 7, 2006

Related U.S. Application Data

(60) Provisional application No. 60/669,449, filed on Apr. 8, 2005.

(51) Int. Cl.
  *E04H 12/18* (2006.01)
(52) U.S. Cl. .................. 52/108; 52/646; 52/745.19; 138/119; 29/897
(58) Field of Classification Search ............ 52/108, 52/117, 222, 645, 646, 648, 648.1, 745.19; 403/286, 291, 292, 293; 16/226, 227; 138/119, 138/174; 29/897
See application file for complete search history.

(56) References Cited

U.S. PATENT DOCUMENTS

| | | | |
|---|---|---|---|
| 889,395 | A | 6/1908 | Noyes |
| 908,999 | A | 1/1909 | Johnson |
| 1,531,982 | A | 3/1925 | Sago |
| 1,637,259 | A | 7/1927 | Malone |
| 2,130,993 | A | 9/1938 | Dubilier |
| 2,405,274 | A | 8/1946 | Stites |
| 2,643,745 | A | 6/1953 | Olszewski |
| 2,661,082 | A | 12/1953 | Ziegler |
| 2,709,975 | A | 6/1955 | Brooks |
| 2,727,220 | A * | 12/1955 | Buchanan et. al. .......... 439/812 |

(Continued)

FOREIGN PATENT DOCUMENTS

GB     2015616     9/1979

OTHER PUBLICATIONS

U.S. Appl. No. 11/080,357, filed Mar. 15, 2005, entitled Deployable Structural Assemblies, Systems for Deploying Such Structural Assemblies and Related Methods.

(Continued)

*Primary Examiner*—Robert J Canfield
*Assistant Examiner*—Brent W Herring
(74) *Attorney, Agent, or Firm*—TraskBritt

(57) ABSTRACT

A deployable structural assembly is provided along with associated deployment mechanisms and associated methods of forming and deploying the deployable structural assembly. In one exemplary embodiment, the deployable structural assembly includes a first structural component and a second structural component. The two structural components have their respective longitudinal edges hingedly coupled to one another. In one embodiment, the hinged connections may include a plurality of discrete flex joints, each having a titanium or other high strength foldable component. In one embodiment of the invention, the structural components each include longitudinal members which, when the deployable structural assembly is collapsed and stored in a coiled rolled configuration, are laterally offset from one another such that they do not become radially stacked. Such a configuration enables storage to the structural assembly with reduced stress in the longitudinal members.

32 Claims, 17 Drawing Sheets

U.S. PATENT DOCUMENTS

| | | | |
|---|---|---|---|
| 2,796,299 A | 6/1957 | Freeman | |
| 2,799,368 A | 7/1957 | Alter | |
| 2,986,417 A | 5/1961 | Baker | |
| 3,012,635 A | 12/1961 | Blain | |
| 3,144,104 A | 8/1964 | Weir et al. | |
| 3,187,466 A | 6/1965 | Zerr | |
| 3,208,478 A * | 9/1965 | Baines | 138/162 |
| 3,213,573 A | 10/1965 | Bohr et al. | |
| 3,221,464 A | 12/1965 | Miller | |
| 3,237,256 A * | 3/1966 | Young | 24/16 PB |
| 3,277,614 A | 10/1966 | Georges | |
| 3,357,457 A * | 12/1967 | Myer | 138/166 |
| 3,361,377 A * | 1/1968 | Trexler, Jr. | 242/390.2 |
| 3,385,397 A * | 5/1968 | Robinsky | 182/41 |
| 3,434,254 A * | 3/1969 | Rubin | 52/108 |
| 3,434,674 A * | 3/1969 | Groskopfs | 242/390.2 |
| 3,473,758 A * | 10/1969 | Valentijn | 244/172.7 |
| 3,486,279 A | 12/1969 | Mauch | |
| 3,503,164 A * | 3/1970 | Medal et. al. | 52/108 |
| 3,508,587 A * | 4/1970 | Mauch | 138/119 |
| 3,528,543 A * | 9/1970 | Robinsky | 428/178 |
| 3,532,742 A | 10/1970 | Weber | |
| 3,543,806 A | 12/1970 | Rushing et al. | |
| 3,546,049 A | 12/1970 | Kostick | |
| 3,564,789 A * | 2/1971 | Vyvyan et al. | 52/108 |
| 3,601,940 A | 8/1971 | Simon | |
| 3,645,146 A | 2/1972 | Nagin | |
| 3,749,133 A * | 7/1973 | Bochory | 138/119 |
| 3,805,462 A | 4/1974 | Caperton | |
| 3,811,633 A * | 5/1974 | Cummings et al. | 226/172 |
| 3,874,543 A * | 4/1975 | Farnsworth | 217/48 |
| 3,913,105 A | 10/1975 | Williamson e tal. | |
| 3,937,426 A | 2/1976 | Pearce | |
| 4,018,397 A | 4/1977 | Rusch et al. | |
| 4,027,440 A | 6/1977 | Hamblin | |
| 4,045,931 A * | 9/1977 | Becker | 52/406.1 |
| 4,237,662 A | 12/1980 | Kinzler | |
| 4,332,501 A | 6/1982 | Slysh | |
| 4,334,391 A | 6/1982 | Hedgepeth et al. | |
| 4,337,560 A | 7/1982 | Slysh | |
| 4,386,485 A | 6/1983 | Kramer | |
| 4,475,323 A | 10/1984 | Schwartzberg et al. | |
| 4,480,415 A | 11/1984 | Truss | |
| 4,504,175 A | 3/1985 | Zion | |
| 4,524,552 A | 6/1985 | Hujsak | |
| 4,532,742 A | 8/1985 | Miura | |
| 4,539,786 A | 9/1985 | Nelson | |
| 4,557,083 A | 12/1985 | Zanardo | |
| 4,557,097 A | 12/1985 | Mikulas, Jr. et al. | |
| 4,569,176 A | 2/1986 | Hedgepeth et al. | |
| 4,574,535 A | 3/1986 | Pabsch | |
| 4,578,919 A | 4/1986 | Amadon et al. | |
| 4,587,777 A | 5/1986 | Vasques et al. | |
| 4,599,832 A | 7/1986 | Benton et al. | |
| 4,612,750 A | 9/1986 | Maistre | |
| 4,614,502 A | 9/1986 | Nelson | |
| 4,637,180 A | 1/1987 | Zeigler | |
| 4,651,480 A | 3/1987 | Kramer | |
| 4,655,022 A | 4/1987 | Natori | |
| 4,662,130 A | 5/1987 | Miura et al. | |
| 4,676,032 A | 6/1987 | Jutras | |
| 4,677,803 A | 7/1987 | Mikulas, Jr. et al. | |
| 4,686,134 A | 8/1987 | Ono | |
| 4,725,025 A | 2/1988 | Binge et al. | |
| 4,783,936 A | 11/1988 | Hujsak | |
| 4,866,893 A | 9/1989 | McGinnis | |
| 4,918,884 A * | 4/1990 | Okazaki et al. | 52/108 |
| 4,920,710 A | 5/1990 | Paine | |
| 4,958,474 A | 9/1990 | Adams | |
| 4,969,301 A | 11/1990 | Warden | |
| 5,016,418 A | 5/1991 | Rhodes et al. | |
| 5,056,278 A | 10/1991 | Atsukawa | |
| 5,094,046 A | 3/1992 | Preiswerk | |
| 5,154,027 A | 10/1992 | Warden | |
| 5,167,160 A | 12/1992 | Hall, II | |
| 5,168,679 A | 12/1992 | Featherstone | |
| 5,235,788 A * | 8/1993 | Maimets | 52/108 |
| 5,267,424 A | 12/1993 | Douglas | |
| 5,347,770 A | 9/1994 | McDonnell et al. | |
| 5,355,643 A | 10/1994 | Bringolf | |
| 5,803,418 A | 9/1998 | Bringolf et al. | |
| 5,857,648 A | 1/1999 | Dailey et al. | |
| 5,921,048 A | 7/1999 | Francom et al. | |
| 5,977,932 A * | 11/1999 | Robinson | 343/895 |
| 6,076,770 A | 6/2000 | Nygren et al. | |
| 6,112,474 A | 9/2000 | Paine | |
| 6,175,989 B1 * | 1/2001 | Carpenter et al. | 16/225 |
| 6,230,428 B1 * | 5/2001 | Albin | 40/730 |
| 6,256,938 B1 * | 7/2001 | Daton-Lovett | 52/108 |
| 6,321,503 B1 | 11/2001 | Warren | |
| 6,343,442 B1 | 2/2002 | Marks | |
| 6,345,482 B1 * | 2/2002 | Warren | 52/646 |
| 6,374,565 B1 | 4/2002 | Warren | |
| 6,453,973 B1 | 9/2002 | Russo | |
| 6,560,942 B2 * | 5/2003 | Warren et al. | 52/646 |
| 6,571,914 B2 | 6/2003 | Lee et al. | |
| 6,647,668 B1 | 11/2003 | Cohee et al. | |
| 6,701,679 B2 | 3/2004 | Zazula et al. | |
| 6,843,029 B2 * | 1/2005 | Breitbach et al. | 52/108 |
| 6,904,722 B2 | 6/2005 | Brown et al. | |
| 6,910,304 B2 * | 6/2005 | Warren | 52/108 |
| 6,920,722 B2 * | 7/2005 | Brown et al. | 52/108 |
| 6,931,812 B1 | 8/2005 | Lipscomb | |
| 7,028,442 B2 | 4/2006 | Merrifield | |
| 2002/0112417 A1 * | 8/2002 | Brown et al. | 52/108 |
| 2004/0194397 A1 | 10/2004 | Brown et al. | |
| 2004/0220004 A1 | 11/2004 | Bourc'His | |
| 2005/0126106 A1 | 6/2005 | Murphy et al. | |

OTHER PUBLICATIONS

AEC-ABLE, "NASA SBIR Phase 2 Proposal for New Structures for Large Sensor Array Platforms: Hardware Development of Second-Order Augmentation of Lattice Trusses," Jul. 14, 2003.

AEC-ABLE, "New Structures for Large Sensor Array Platforms—Phase 1 Final Report," Jun. 14, 2003.

Crawford, R.F., "Strength and Efficiency of Deployable Booms for Space Applications," AAS/AIAA Variable Geometry and Expandable Structures Conf., Anaheim, California, AIAA Paper.

J.D. Lincoln Inc., Product Data Sheet for L-695, Cyanate Ester Prepreg, httn://www.jdlincoln.com., copyright 1999-2005.

JPS Glass, "Advanced Composites," http://www.jpsglass.com/advanced.htm., (no date).

Murphey, Thomas W., "Performance Trends in Hierarchical Space Structures," posted to AEC-Able's Website, Apr. 2002.

PowerPoint Slides used in Dec. 12, 2002 Briefing by AEC-ABLE to the National Reconnaissance Organization.

* cited by examiner

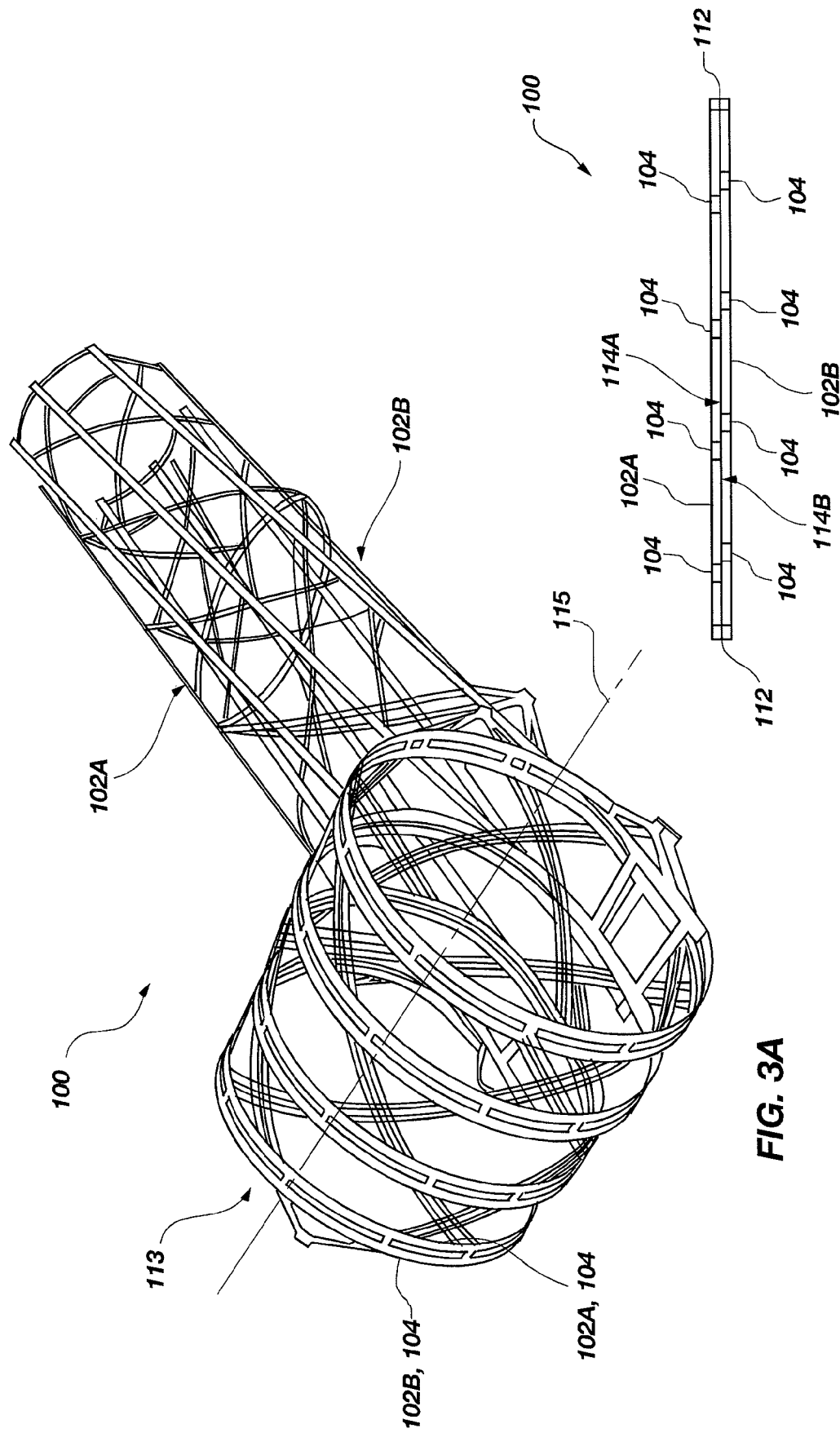

DEPLOYABLE STRUCTURAL ASSEMBLIES, SYSTEMS FOR DEPLOYING SUCH STRUCTURAL ASSEMBLIES AND RELATED METHODS

CROSS-REFERENCE TO RELATED APPLICATION

The present application claims the benefit of U.S. Provisional Application Ser. No. 60/669,449 entitled DEPLOYABLE STRUCTURAL ASSEMBLIES, SYSTEMS FOR DEPLOYING SUCH STRUCTURAL ASSEMBLIES AND RELATED METHODS filed on Apr. 8, 2005, the disclosure of which is incorporated by reference herein in its entirety.

BACKGROUND OF THE INVENTION

1. Field of the Invention

The present invention is generally related to deployable structural assemblies and, more particularly, to generally elongated, deployable structural assemblies having a high bending stiffness to weight ratio, that are highly compact for storage purposes, are efficiently deployed and retracted, and are suitable for numerous uses.

2. State of the Art

It is often desirable to utilize a deployable structural assembly in various circumstances and environments. For example, deployable structural assemblies, sometimes referred to as deployable booms, may be utilized in conjunction with satellites or other aerospace vehicles. In many instances, the rigors of launching a satellite or aerospace vehicle make it impractical to have a structural assembly in an already-deployed condition or as a permanent installation such that it is extending or protruding from the vehicle during launch. Thus, it is often desirable to delay the deployment of a structural assembly until the satellite or vehicle with which it is associated is in a stable flight pattern, or is in orbit, or until the structural assembly is needed for a specific purpose.

Even after an aerospace vehicle has been placed in a stable flight pattern or in orbit, it may not be desirable to continually maintain a structural assembly in a deployed state. Thus, it becomes desirable to utilize a structural assembly that is capable of being deployed and retracted, relative to the satellite or aerospace vehicle, when desired or on demand. Such a structural assembly may be utilized to deploy, for example, solar sails or solar shields in association with a satellite after the satellite is placed in orbit. Deployable structural assemblies may also be used, for example, as an aid to an astronaut during maintenance activities when the astronaut is required to leave his or her aerospace vehicle to perform a specified activity, such as during the repair of a satellite or another aerospace vehicle.

Of course deployable structural assemblies have utilization in other circumstances as well, including, generally, situations where it would be inefficient to build a permanent structural assembly but where a structural member or assembly is required to provide additional height or to span a distance in order to place and/or support a given component or structure at a specified location. In one example, a deployable structural assembly may be used to position a bank of lights above a specified area such as in an emergency situation or in association with an outdoor concert or other activity. Similarly, a deployable structural assembly might be used to position an antenna or other communications device. In another example, one or more deployable structural assemblies may be used to support a raised platform which may serve as a working surface for one or more people.

Numerous configurations of deployable structural assemblies have been developed. For example, U.S. Pat. No. 3,503,164 issued to Berry et al., U.S. Pat. No. 3,543,806 issued to Rushing et al., U.S. Pat. No. 3,601,940 issued to Simon, U.S. Pat. No. 3,811,633 issued to Cummings et al., U.S. Pat. No. 6,345,482 issued to Warren, and U.S. Pat. No. 6,560,942 issued to Warren et al. each disclose various types of deployable structures.

The Berry et al. patent discloses a tubular extendable structure that is formed of a pair of elongated sheets which are pre-stressed in a predetermined manner so that they curl about their respective longitudinal axes when unrestrained. Each sheet includes a series of interlocking components formed along each longitudinal edge thereof for engagement with corresponding interlocking components formed in the other associated sheet. With the interlocking components of each sheet engaged with one another, the sheets may be flattened for rolling onto a drum and, when in the rolled state, they store energy associated with deforming the sheets from their prestressed state. Upon unrolling of the sheets, the stored energy causes them to resume their previous configuration including the exhibited curl about their longitudinal axes.

The Rushing et al. patent discloses an extendible boom formed of a single sheet of "springlike material" which may be rolled onto a reel for storage. When released from the reel, the sheet curls together edgewise and forms a hollow tubular shape as a rod or a boom. The edges of the sheet include tabs that may engage one another when the sheet is curled.

The Simon patent discloses a structure similar to that of the Rushing et al. patent wherein the joined edges of the material sheet form a helical seam about the resulting boom.

The Cummings et al. patent discloses a collapsible/extendible tubular structure having four walls wherein two oppositely disposed walls include a pair of elongated ribbons joined along their longitudinal edges to form a plurality of "cusps" which allow the structure to be folded flat and then wound into a coil.

The Warren and Warren et al. patents disclose an open lattice, foldable, self-deployable structure having longitudinal members configured to bend and diagonal members configured to bend and twist about certain axes. The structure is described as being folded or rolled without material yielding and as being "self resurrecting" during deployment.

While the above-listed U.S. Patents show various configurations of deployable structural assemblies, it is desirable to improve upon the deployable structural assemblies disclosed in the prior art with regard to various features. For example, it is desirable to provide a deployable structural assembly that enables efficient, simplified and reliable deployment and retraction. Additionally, it is desirable to provide a deployable structural assembly with an improved strength and stiffness to weight ratio while also being scalable in design such that various lengths, cross-sectional sizes and load capacities may be provided. It is also desirable to provide a deployable structural assembly that provides a significant reduction in stowed size and an improved packing factor as defined hereinbelow.

BRIEF SUMMARY OF THE INVENTION

The present invention provides a deployable structure and related methods having a plurality of hingedly coupled structural components that form a structurally efficient member capable of simple deployment and retraction for storage purposes. The deployable structure is lightweight and highly compact when in the stored state such that it may be readily transported and selectively deployed when needed.

In accordance with one aspect of the present invention, an apparatus including deployable structural assembly is provided. The deployable structural assembly includes a first structural component having at least one longitudinal member and a second structural component having at least one longitudinal member. A first plurality of discrete flex joints couple a first edge of the first structural component and a first edge of the second structural component. A second plurality of discrete flex joints couple a second edge of the first structural component and a second edge of the second structural component. In one embodiment, the flex joints may include a metallic foldable component bonded to a portion of the first structural component and bonded to a portion of the second structural component.

In accordance with another aspect of the present invention, a structural assembly configured to be selectively positioned in a deployed state and a stowed state is provided. The structural assembly includes a first structural component having at least one longitudinal member and a second structural component having at least one longitudinal member hingedly coupled with the first structural component. The structural components are configured such that, when the structural assembly is in a stowed state the first structural component is pressed against the second structural component and coiled about a defined axis. Additionally, when in the stowed state, the at least one longitudinal member of the first structural component is offset relative to the at least one longitudinal member of the second structural component in a direction extending along the defined axis. In another embodiment, each structural component may include a plurality of longitudinal members and, when in a stowed state, each longitudinal member of the first structural component is laterally offset relative to each longitudinal member of the second structural component along a direction of the defined axis.

In accordance with a further aspect of the present invention, a method is provided for forming a deployable structural assembly. The method includes providing a first structural component having at least one longitudinal member and providing a second structural component having at least one longitudinal member. A first longitudinal edge of the first structural component is hingedly coupled to a first longitudinal edge of the second structural component and a second longitudinal edge of the first structural component is hingedly coupled to a second longitudinal edge of the second structural component such that the first structural component and the second structural component may be collapsed against each other and rolled about a defined axis. The structural components are configured such that, when the structure is collapsed and rolled about the defined axis, the at least one longitudinal member of the first structural component is laterally offset relative to at least one longitudinal member of the second structural component in a direction along the defined axis.

In accordance with yet another aspect of the present invention an apparatus is provided including a deployable structural assembly. The deployable structural assembly includes a first structural component having at least one longitudinal member and a second structural component having at least one longitudinal member. A first plurality of discrete flex joints couple a first edge of the first structural component and a first edge of the second structural component. A second plurality of discrete flex joints couple a second edge of the second structural component and a second edge of the second structural component. The apparatus further includes a deployment mechanism, wherein the deployment mechanism is configured to deploy the deployable structural assembly from a coiled, stowed condition to a deployed, longitudinally extending condition.

In accordance with yet another aspect of the present invention an apparatus is provided including a deployable structural assembly configured to be selectively positioned in a deployed state and a stowed state. The structural assembly includes a first structural component having at least one longitudinal member and a second structural component having at least one longitudinal member hingedly coupled with the first structural component. The structural components are configured such that, when the structural assembly is in a stowed state, the first structural component is pressed against the second structural component and coiled about a defined axis. Additionally, when in the stowed state, the at least one longitudinal member of the first structural component is offset relative to the at least one longitudinal member of the second structural component in a direction extending along the defined axis. The apparatus further includes a deployment mechanism, wherein the deployment mechanism is configured to deploy the deployable structural assembly from a coiled, stowed condition to a deployed, longitudinally extending condition.

The present invention, including its various embodiments, aspects and features, provides numerous advantages as compared to prior art structures and assemblies. For example, the present invention provides a structure having a high strength and stiffness to weight ratio, and demonstrates improved efficiency in terms of being stored in relatively small volumes, including a relatively small stowed height, as compared to its deployed volumes. The deployment mechanism of the present invention also provides for a small transition distance between the stowed state of a structural side element and a deployed state thereof.

Furthermore, the present invention is readily scalable to any length or cross-sectional size. The design and the configuration of the structural components of the present invention provide an open center geometry enhancing the flexibility of the structure in terms of different uses and applications for which the structure is suitable. In certain embodiments, electronic components may be integrated with the structural components of the deployable structural assemblies. The design of the deployable structural assemblies enables simplified manufacturing of the structural components and provides considerable flexibility in the manufacturing and design process of such structural components.

The structure of the present invention also enables controllable deployment thereof including auto-retraction and repeatable deployment. Additionally, the structure of the present invention exhibits low thermal distortion properties, good damping characteristics and a low amount of stored energy when in a stowed state.

BRIEF DESCRIPTION OF THE SEVERAL VIEWS OF THE DRAWINGS

The foregoing and other advantages of the invention will become apparent upon reading the following detailed description and upon reference to the drawings in which:

FIG. 3A shows a perspective view of the structure shown in FIG. 1 with a portion thereof in a collapsed state for storage;

FIG. 3B shows a cross-sectional view of a portion of the structure shown in FIG. 3A while the portion is in a collapsed state;

DETAILED DESCRIPTION OF THE INVENTION

Figure 1:
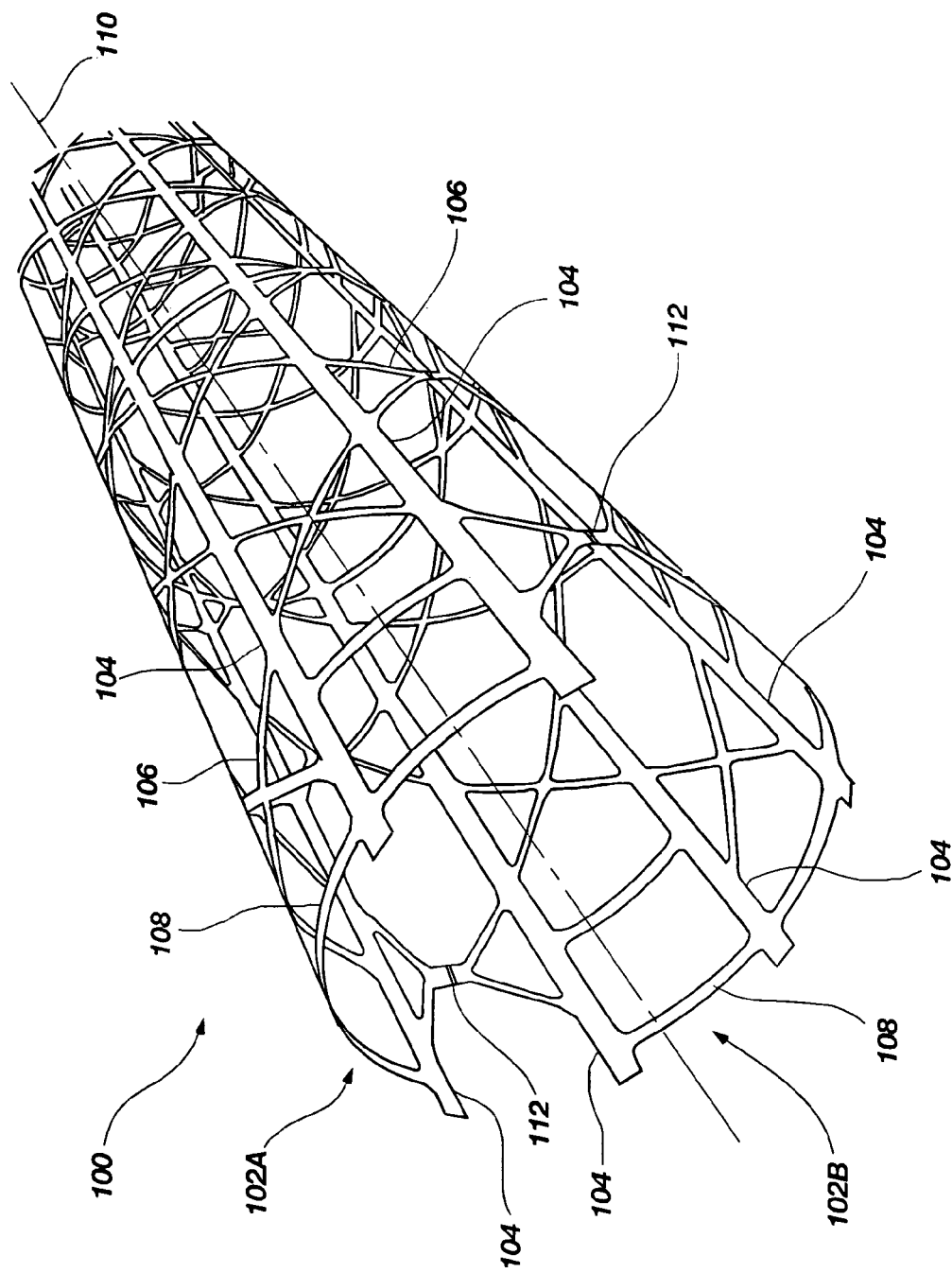
FIG. 1 is a perspective view of a deployable structural assembly in accordance with an embodiment of the present invention.

Referring to FIG. 1, a deployable structure, referred to herein as a boom 100 for purposes of brevity and convenience, is shown. The boom 100 is formed of two or more structural components 102A and 102B. Each structural component 102A and 102B may include a plurality of longitudinal members 104, which may be referred to as longerons, spaced apart from one another and connected to one another by way of diagonal members 106, also known herein as diagonals. Additionally, in one embodiment, cross-members 108 (also referred to as battens) may extend between and be connected to the longitudinal members 104 and may also, optionally, be coupled with the diagonal members 106.

The longitudinal members 104 are desirably formed as structures exhibiting a high axial stiffness while also exhibiting low bending stiffness such that they are furlable about an axis that is substantially perpendicular to a longitudinal axis 110 of the boom 100. In other words, the longitudinal members 104 must be able to withstand substantial axial loading while in the deployed condition, while also being capable of being repeatedly furled or rolled into a rolled or coiled member (not shown in FIG. 1) or otherwise folded for storing.

In one embodiment, the longitudinal members 104 may be formed as a single layer of material. In another embodiment, the longitudinal members 104 may be formed as a laminar structure having multiple layers of the same or of different materials. In one exemplary embodiment, a multicomponent longitudinal member may include a first highly flexible composite laminate structure bonded to a second composite material that is highly directional exhibiting a high degree of axial stiffness in a direction parallel to the longitudinal axis 110 of the boom 100. In another embodiment, a highly directional material may be sandwiched between two layers of material exhibiting increased flexibility as compared to the highly directional material. In more general terms, construction of the longitudinal members 104 in accordance with such embodiments may include multiple layers of material wherein the layer of material exhibiting the highest axial stiffness is placed in the center of the thickness of the longitudinal members or, more accurately, along or near the neutral axis of the longitudinal members 104 as will be appreciated by those of ordinary skill in the art.

In one particular embodiment, the longitudinal members 104 may be formed of a first layer of fiber reinforced composite material such as, for example, a quartz, glass or silica fiber material (such as that which is currently marketed under the ASTROQUARTZ® trademark) with a cyanate-esther resin. Of course other materials may be utilized. For example, para-aramid fibers, available under the trademark KEVLAR®, may be used and other resins may be employed. Additionally, in some embodiments, composite materials need not be used. For example, the first layer used to form the longitudinal members 104 may include a layer of titanium or other metal or metal alloy.

It is noted that the use of a quartz or silica fiber or fabric enables the use of a laser for cutting the composite material and provides low moisture absorbing characteristics (although other materials such as titanium may provide similar characteristics) while the use of a cyanate-esther resin provides advantageous outgassing characteristics which are desirable in the transport of such materials into a space environment. A second layer of material, for example, a carbon reinforced fiber material, which may also include a cyanate-esther resin, may then be bonded to the first layer of material. Depending on the materials being used, the geometric complexity of the parts, the allowable tolerances of the manufactured components and other factors, the material layers may be cut, for example, by a laser cutting machine that enables the efficient and precise fabrication of complex geometries or by stamping or use of a water jet cutting machine that provides a reasonable level of precision and complexity at a relatively lower cost of fabrication than that of a laser cutter. Of course other methods of forming or shaping the first and second layers of material may be utilized as will be appreciated by those of ordinary skill in the art. It is noted that the structural components 102A and 102B may be formed from individual components (e.g., longitudinal members 104, diagonals 106 and battens 108) that are bonded or otherwise joined together. In another embodiment, the structural components 102A and 102B may be formed generally as a unitary structure wherein some or all of the longitudinal members 104, diagonals 106 and battens 108 are formed from a continuous sheet (or laminated sheets) of material.

Figure 2:
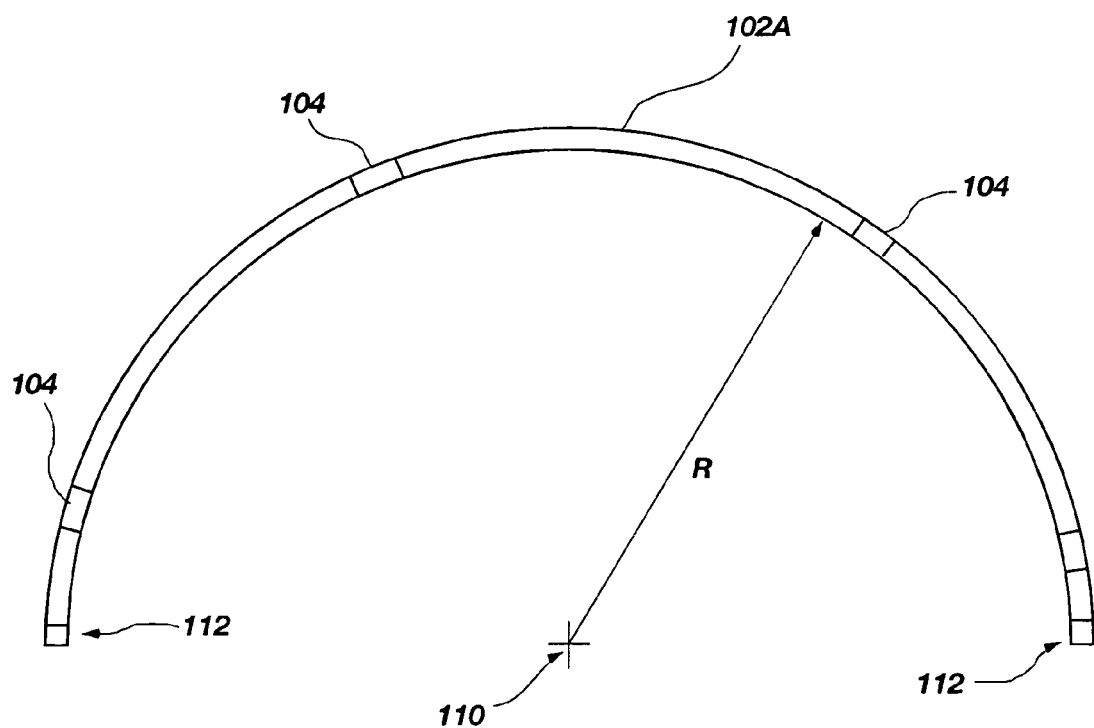
FIG. 2 shows an end elevational view of a portion of the structure shown in FIG. 1.

As shown in FIG. 2, a structural component 102A may be formed such that it exhibits a radius of curvature R about the longitudinal axis 110 of the boom 100 while the structural component 102A is in a relaxed state or, in other words, when the structural component 102A is not being subjected to any external forces. Depending on the material used to form the structural component 102A, the radius of curvature R may be defined by forming the structural component 102A on a mandrel having a desired radius of curvature or by pre-yielding the material to exhibit the radius of curvature R as will be appreciated by those of ordinary skill in the art.

Still referring to FIG. 1, the structural components 102A and 102B are coupled together at a plurality of locations in a manner that provides a plurality of foldable flex joints 112 between the structural components 102A and 102B. The flex joints 112 enable the structural components 102A and 102B to be folded relative to one another in a hinged manner for purposes of storing the boom 100. In one exemplary embodiment, the boom 100 may be configured to include eight longitudinal members 104 disposed at substantially equal distances from one another about the cross-sectional circumference of the boom 100 along with two sets of diametrically opposed flex joints 112.

In addition to the flex joints 112 enabling a folding or collapsing of the structural components 102A and 102B relative to one another, the structural components 102A and 102B may be deformed, without exceeding their respective material yield limits, for storage purposes. Thus, as shown in FIG. 3A, the structural components 102A and 102B, or portions thereof, may be deformed relative to their curved shape and the flex joints 112 may enable a folding action between the structural components 102A and 102B, such that a portion of each structural component (e.g., 102A) lies flat adjacent a corresponding portion of an associated structural component (e.g., 102B) as generally indicated by stored state 113.

Referring to FIGS. 3A and 3B, a portion of the boom 100 is shown in a stored state (generally indicated at 113) wherein the structural components 102A and 102B are flattened and generally pressed against each other such that the boom 100 may be rolled or coiled (or otherwise folded) for storage. The arrangement of the flex joints 112 enables the structural components 102A and 102B to flatten such that a cross-sectional face 114A (taken transversely to the longitudinal axis) of one structural component 102A abuts a cross-sectional face 114B of the other structural component 102B in a substantially linear or planar fashion such as shown in FIG. 3B.

When in a collapsed or stored state, the longitudinal members 104 of a first structural component 102A are laterally offset relative to the longitudinal members 104 of a second corresponding structural component 102B. In other words, considering the stored state 113 as a rolled or coiled configuration, the longitudinal members 104 of the radially exteriorly located structural component 102B are not stacked directly radially outward from the longitudinal members 104 of the radially interiorly adjacent structural component 102A with respect to a coil axis 115. This can also be seen in FIG. 3B which shows a cross-sectional view of the boom 100 while in a collapsed or stored state.

The offsetting of longitudinal members 104 from one structural component 102A to another structural component 102B of a boom 100 when the boom is in a collapsed or folded state provides a structure that may be rolled or coiled with reduced stress in the longitudinal members 104. In other words, if the longitudinal members 104 of a radially exterior structural component 102A (when coiled) are radially stacked on the longitudinal members 104 of a radially interior structural component 102B, the bending thickness of such longitudinal members is effectively doubled since the structural components 102A and 102B are coupled at the edges by the flex joints 112. It is noted that the bending stiffness and stress increase as a cube of the thickness. Thus, if the bending thickness is doubled (such as by radially stacking them during storage), the bending stiffness and stress are increased by a factor of eight.

In accordance with the presently disclosed embodiment of the present invention, the laterally offset arrangement of the longitudinal members 104 of a first structural component 102A with respect to the longitudinal members 104 of the second structural component 102B allows the radially inner structural component 102A (when coiled) to bulge out, in part due to the relatively open lattice structure of the boom 100 (as partly defined by diagonals 106, battens 108 or both) such that the longitudinal members 104 of the radially inner structural component 102A need not be restrained to a tighter radius than that of the longitudinal members 104 of the radially outer structural component 102B.

In one particular example, the boom 100 may be configured such that it includes eight total longitudinal members 104 (four longitudinal members 104 in each structural component 102A and 102B). Additionally, such a boom may exhibit an inner diameter of approximately 12.7 centimeters (cm), a length of approximately 2.0 meters (m), a wall thickness of approximately 0.33 millimeters (mm) and a linear density of approximately 65 grams/meter (g/m). Such a boom 100 will have a predicted bending stiffness of approximately 3,500 Newton-meters squared ($Nm^2$). Of course, other configurations are contemplated and it will be recognized by those of ordinary skill in the art that such a boom 100 may be scaled to different sizes and that such dimensions and characteristics are merely examples.

Figure 4A:
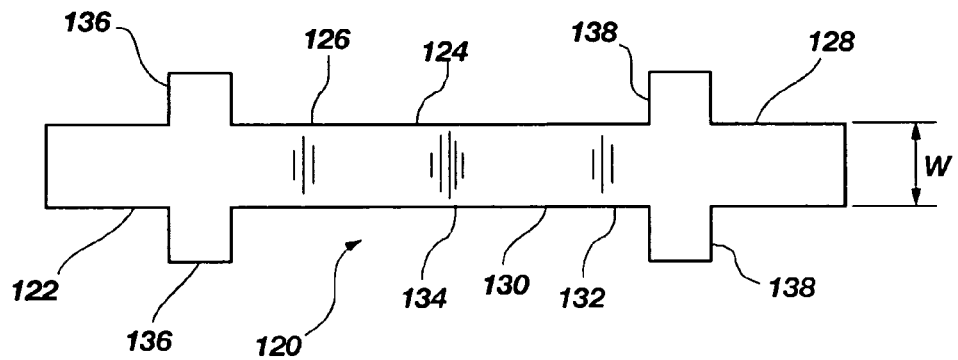
FIGS. 4A and 4B show various views of a foldable component used in a joint of the structure shown in FIG. 1 in accordance with one aspect of the present invention.
Figure 4B:
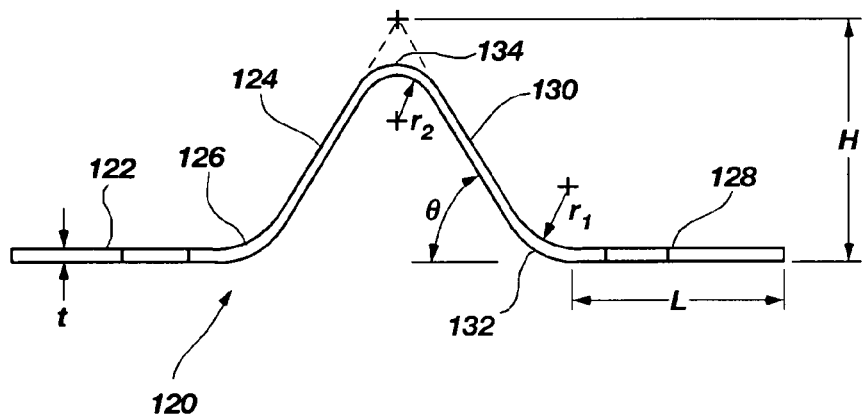
Figure 4C:
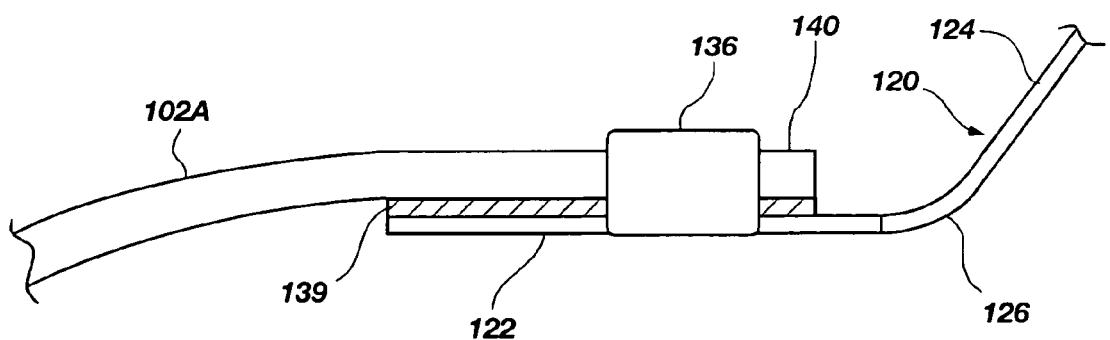
FIG. 4C shows another view of the foldable component shown in FIGS. 4A and 4B joined with a portion of a deployable structural assembly in accordance with an embodiment of the present invention.

Referring now to FIGS. 4A through 4C, details are shown of one example of a flex joint 112. FIGS. 4A and 4B show a foldable component 120 which includes a first wing section 122 coupled to a first central section 124 by way of a generally curved or arcuate section 126 and a second wing section 128 coupled to a second central section 130 by way of a generally curved or arcuate section 132. The first and second central sections 124 and 130 are further joined by another generally curved or arcuate section 134. The first and second wing sections 122 and 128 may further include laterally extending tabs 136 and 138, respectively. The foldable component 120 may be formed of a high strength material exhibiting good fatigue properties such as, for example, titanium or other metals or metal alloys. In another embodiment, the foldable component 120 may be formed from composite materials, such as a fiber reinforced resin matrix material, by laying up the composite materials on a mandrel or other tool to form the desired shape.

In one exemplary embodiment, the first and second wing sections 122 and 128 and the first and second central sections 124 and 130 may exhibit a width W of approximately 0.375 inches (in.) and a thickness t of approximately 0.005 in. Additionally, the first and second wing sections 122 and 128 may exhibit a length L of approximately 0.5 in. The arcuate sections 126 and 132 between corresponding first and second wing sections 122, 128 and first and second central sections 124, 130 may exhibit a radius $r_1$ of approximately 0.03 in. and the arcuate section 134 between the first and second central sections 124 and 130 may exhibit a radius $r_2$ of approximately 0.03 in. An angle $\theta$ between the wing sections 122 and 128 and their corresponding central sections 124 and 130 may be approximately 60°. The height H of the foldable component 120 (measured to the projected intersection of the central sections 124 and 130) may be approximately 0.125 in.

Of course, such dimensions are merely examples and may be altered depending, for example, on a specific application, configuration or scale of the boom 100 (FIG. 1). It is generally noted that it may be desirable in many circumstances to minimize the dimensions of H, $r_1$ and $r_2$ while maximizing the angle $\theta$ so as to provide a compact joint between the two structural components 102A and 102B. However, minimization of the dimensions H, $r_1$ and $r_2$ and maximization of the angle $\theta$ will also result in increased stress developed in the foldable component 120 during bending or folding thereof. Thus, the foldable component 120 is desirably configured to provide as compact a joint as possible while providing an acceptable fatigue limit based on the number of cycles that the boom 100 is expected to transition between a deployed state and a stored state. Such a foldable component 120 may be fabricated, for example, by laser cutting or otherwise excising a flat component from a stock sheet of material and then bending the cut component into the shape generally shown in FIG. 4B. As noted above, the foldable component 120 may also be formed from composite materials using techniques known by those of ordinary skill in the art.

Referring to FIG. 4C, the foldable component may be coupled to a tab 140 of a structural component 102A such as by bonding with an adhesive 139 or by other suitable means. Additionally, laterally extending tabs 136 may be folded over and wrapped about a portion of the structural component 102A to further augment the connection between the foldable component 120 and the structural component 102A. Of course, other means of joining may be used to reinforce the connection between the foldable component 120 and the structural component 102A. It is noted that while the first wing section 122 is shown being coupled to a portion of a first structural component (e.g., 102A), the second wing section 128 is similarly coupled to a portion of a second structural component (e.g., 102B) although not specifically detailed in the drawings.

Figure 5A:
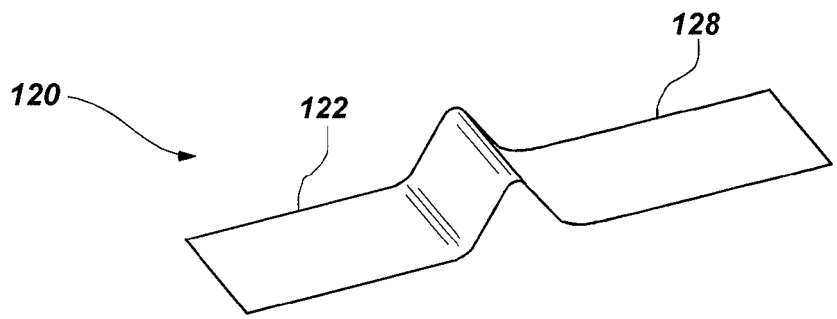
FIGS. 5A through 5C show perspective views of the foldable component shown in FIGS. 4A and 4B representative of different states of deployment or storage of a deployable structural assembly in accordance with an embodiment of the present invention.
Figure 5B:
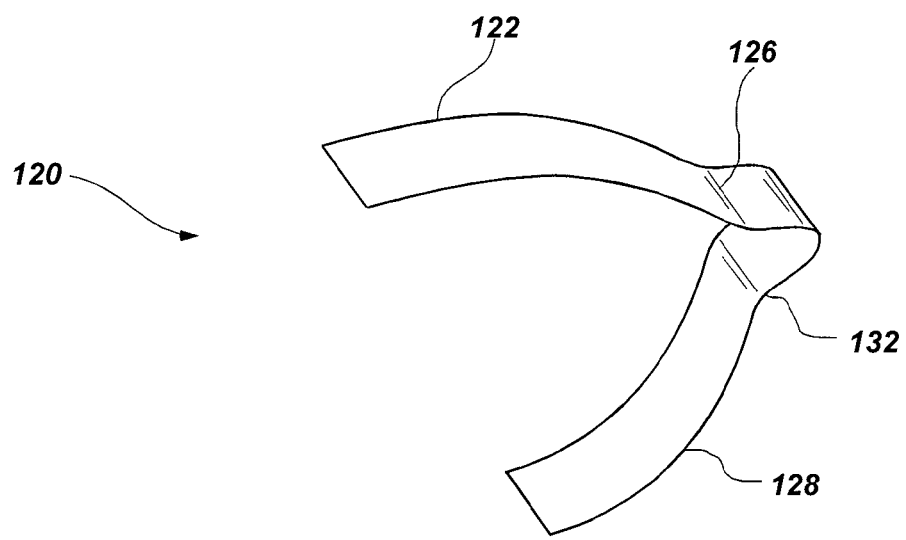
Figure 5C:
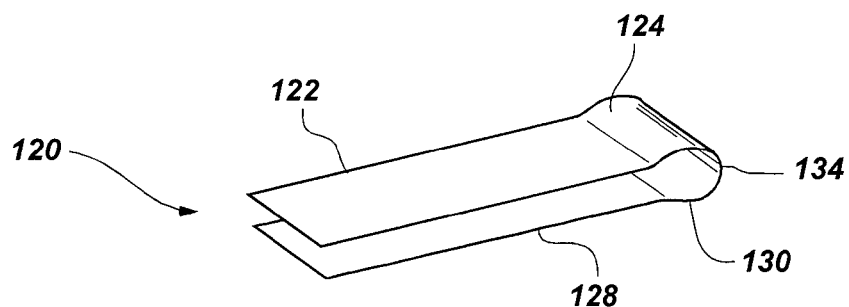

Referring briefly to FIGS. 5A through 5C, the foldable component 120 is shown (less the tabs 136 and 138 for convenience and clarity) in various positions or states which are associated with a deployed state of the boom 100 (FIG. 1), a stored state of the boom 100, and the state wherein the boom 100 is in transition between the deployed and stored state. Referring first to FIG. 5A, the foldable component 120 is shown in a state similar to that in which it would be with the boom 100 is in a deployed state (i.e., as shown in FIG. 1). While in the deployed state, the wing sections 122 and 128 are positioned to generally extend away from one another. In such a state, the foldable component 120 is in a generally "relaxed" state meaning that the external forces to which it is subjected are not of such a magnitude to cause substantial deformation of the foldable component 120 or substantial displacement of any portion thereof relative to any other portion thereof. It is noted that when in an actual deployed state, the foldable component 120 may actually exhibit a relatively minor amount of deformation due to the generally curved cross-sectional configuration (as taken substantially transverse to the longitudinal axis 110) of the boom 100.

Referring next to FIG. 5B, the foldable component 120 is shown in a transition state, such as when the boom 100 is somewhere between a deployed state and a collapsed or stored state. The ends of the wing sections 122 and 128 are displaced generally toward each other such that the respective radii $r_1$ (FIG. 4B) of the arcuate sections 126 and 132 increases. Finally, referring to FIG. 5C, the foldable component 120 is shown while the boom 100 is in a collapsed or stored state (e.g., as indicated generally at 113 in FIG. 3). When in a collapsed or stored state, the wing sections 122 and 128 of the foldable component 120 are generally adjacent one another in a juxtaposed manner. Additionally, the central sections 124 and 130 may become closer to one another, exhibit a bend therein, or both, and the radius $r_2$ (FIG. 4B) of the arcuate section 134 between the central sections 124 and 130 may be reduced.

Figure 6A:
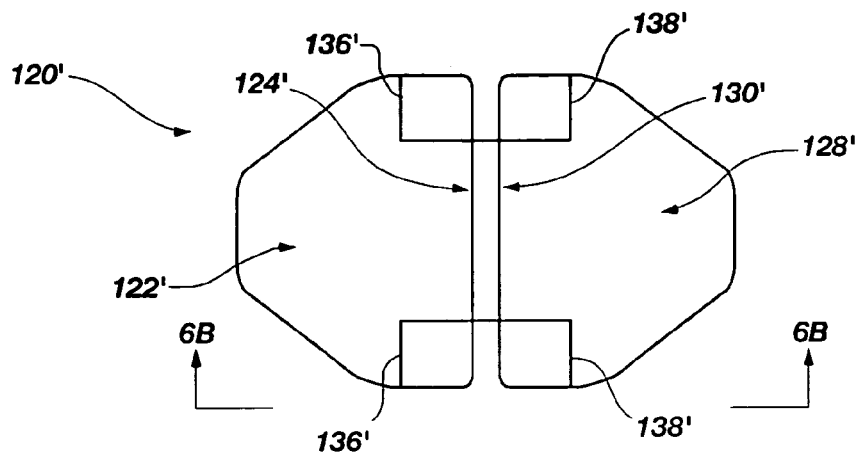
FIGS. 6A through 6D show various views of a foldable component in accordance with another embodiment of the present invention.
Figure 6B:
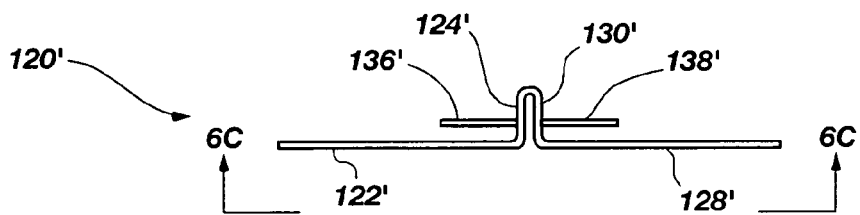
Figure 6C:
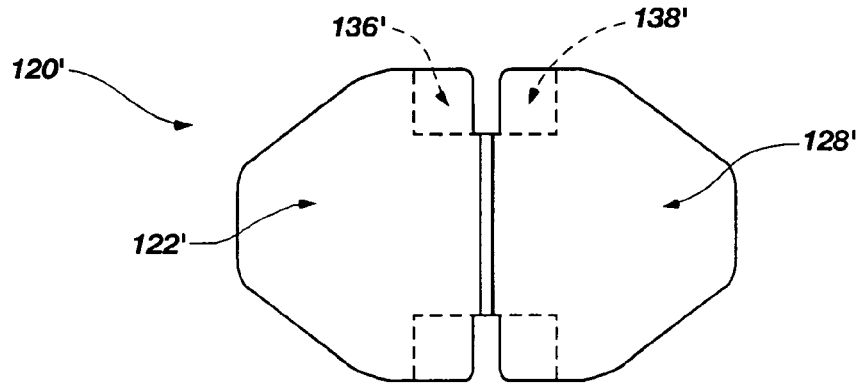

Referring to FIGS. 6A-6D, another embodiment of a foldable component 120' is shown. FIGS. 6A-6C show various views of the foldable component 120' while in a substantially relaxed state (meaning that no external load is being applied to the foldable component 120'). The foldable component 120' includes a first wing section 122' coupled to a first central section 124' such that the two sections exhibit an angle therebetween (see FIG. 6B). The foldable component 120' further includes a second wing section 128' coupled to a second central section 130' such that the two sections exhibit an angle therebetween (see FIG. 6B). The first and second central sections 124' and 130' are further joined together and also exhibit an angle therebetween (see FIG. 6B). A first set of retainer clips or tabs 136' may be coupled to the first wing section 122', and a second set of retainer clips or tabs 138' may be coupled to the second wing section 128'. As with the foldable component 120 described with respect to FIGS. 4A-4C, the foldable component 120' may be formed of a high strength material exhibiting good fatigue properties such as, for example, titanium or other metals or metal alloys. Of course, the foldable component 120' may also be formed from composite materials such as discussed hereinabove.

Figure 6D:
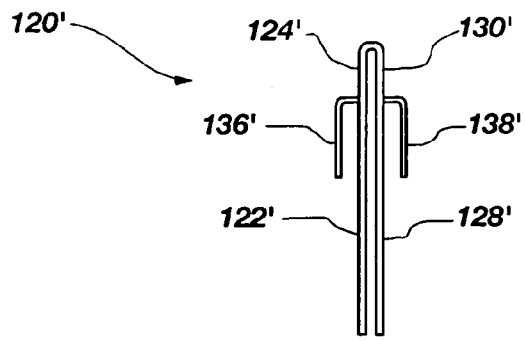

Referring briefly to FIG. 6D, a side view of the foldable component 120' is shown while it is in a loaded state, such as it would be when attached to the structural components 102A and 102B of a boom 100 (FIG. 1) and when the boom 100 is in a collapsed or stored state. As seen in FIG. 6D, the foldable component 120' folds into a compact structure wherein the first and second wing sections 122' and 128' are positioned adjacent each other. Indeed, the foldable component 120' may desirably be configured so that the first and second wing sections 122' and 128' abut each other when the foldable component 120' is in a loaded state (i.e., when the boom 100 is in a collapsed state).

In one embodiment, the foldable component 120' may be fabricated, for example, by laser cutting or otherwise excising a flat component from a stock sheet of material and then bending the cut component into the shape generally shown in FIG. 6B. In another embodiment, the foldable component 120' may be fabricated from multiple pieces of material joined together, such as by welding. For example, the first central section 124' and the second central section 130' may be welded together so as to exhibit the desired angle formed therebetween.

Figure 7A:
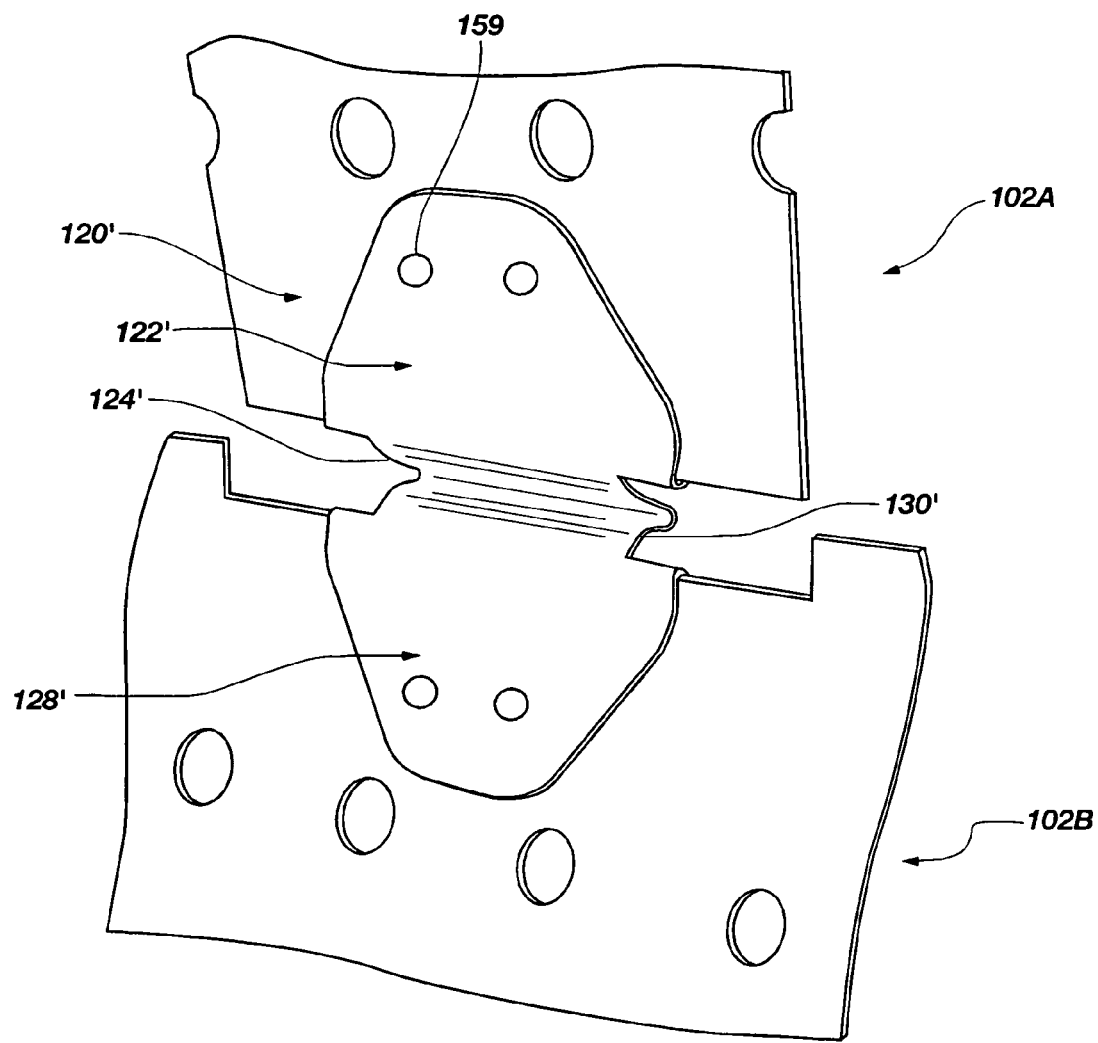
FIGS. 7A and 7B show perspective views of the foldable component shown in FIGS. 6A through 6D coupled to portions of a structural assembly in accordance with an embodiment of the present invention.
Figure 7B:
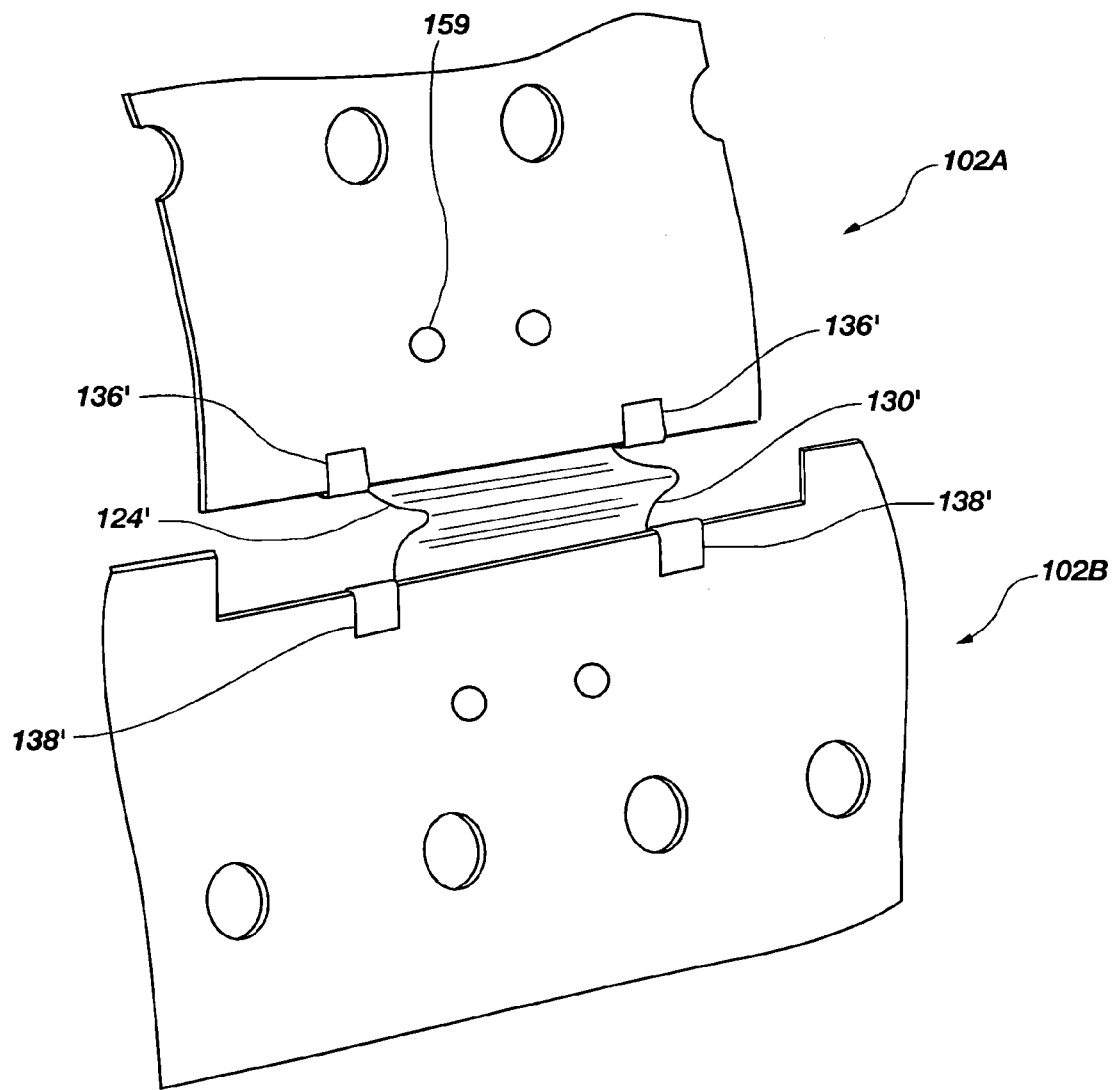

Referring briefly to FIGS. 7A and 7B, an example is shown of the foldable component 120' attached to structural components 102A and 102B. The retainer clips or tabs 136' and 138' are sized, shaped and configured to receive a portion of the structural components 102A and 102B therein. The retainer clips or tabs 136' and 138' help to augment the coupling of the foldable component 120' and the structural components 102A and 102B. In one embodiment, various surfaces of the foldable component 120', such as the first and second wing sections 122' and 128', may be adhered to surfaces of the structural components 102A and 102B. Alternatively, or in addition to the use of an adhesive, mechanical fasteners 159, such as rivets, may be used to join the foldable component 120' with the structural components 102A and 102B.

Figure 8A:
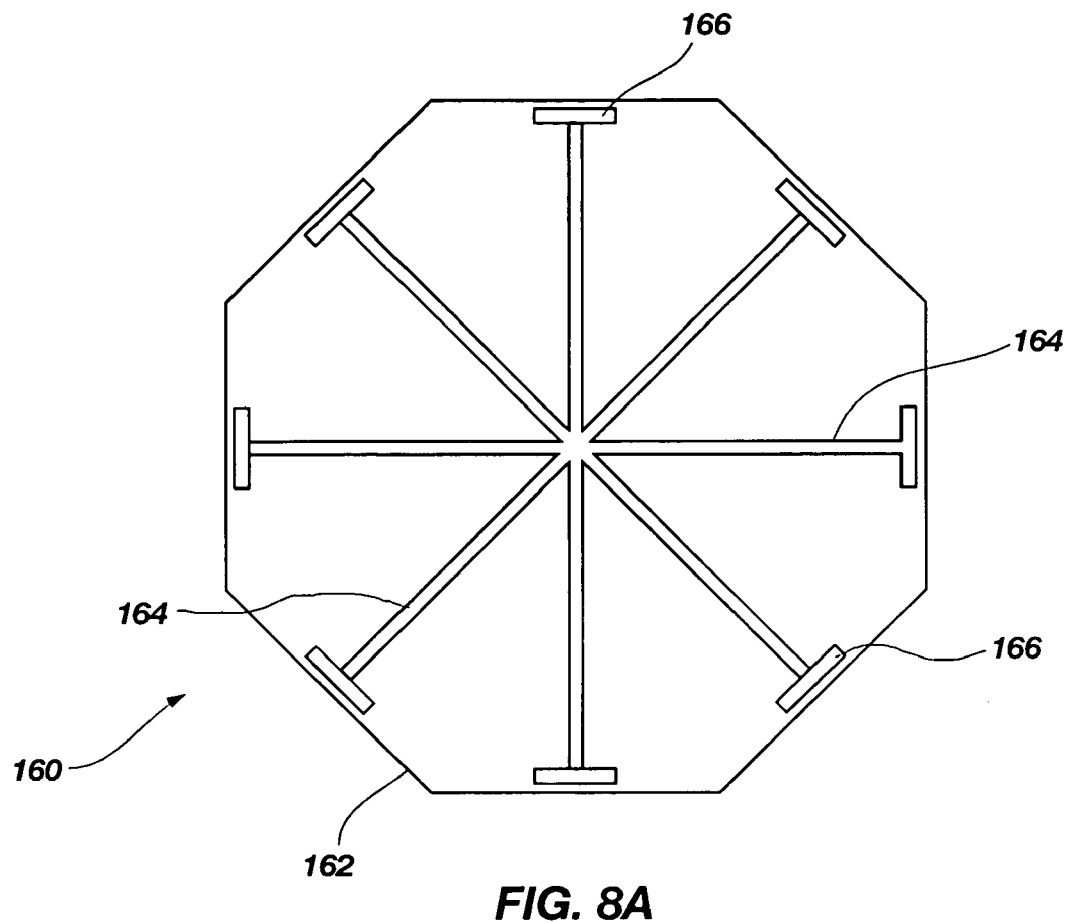
FIGS. 8A and 8B are plan and elevational views, respectively, of a cap member that may be used with a deployable structural assembly in accordance with an aspect of the present invention.
Figure 8B:
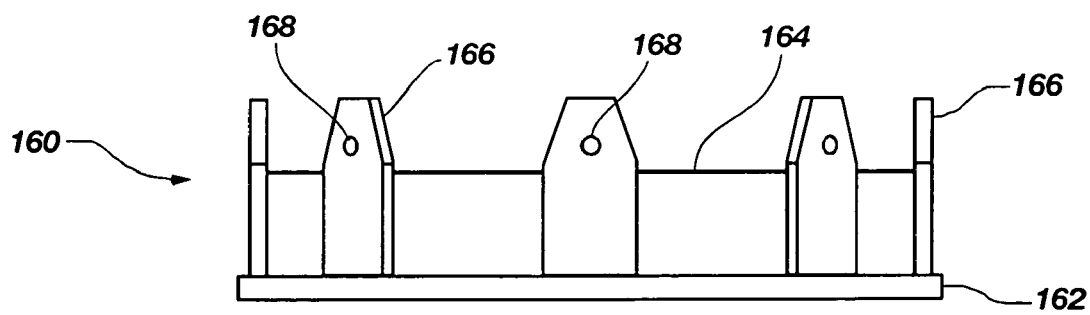

Referring to FIGS. 8A and 8B, a cap 160 is shown which may attached to a longitudinal end of the boom 100 (FIG. 1). The cap 160 may include a plate member 162 having a plurality of reinforcing or structural ribs 164 fixed to a surface of the plate member 162 and a plurality of boom engagement members 166 located at the radial ends of the structural ribs 164 extending from the plate member 162 and configured for engagement with the structural components 102A and 102B of the boom 100 (FIG. 1). For example, the engagement members 166 may be configured to engage the longitudinal members 104 of the boom 100. In one embodiment, the cap 160 may be configured to engage the boom 100 by way of an interference fit (e.g., by way of an interfering dimension between the engagement members 166 and an internal periphery of the boom 100). In another embodiment, the cap 160 may be configured to be coupled with the boom 100 by way of mechanical fasteners such as through fastener holes 168 formed in the engagement members 166 and corresponding fastener holes (not shown) in the boom 100. Such a cap 160 may be used as a structural reinforcement member for the boom 100, for example, to provide additional radial rigidity at least at the longitudinal end of the boom 100 to which it is coupled.

Figure 9A:
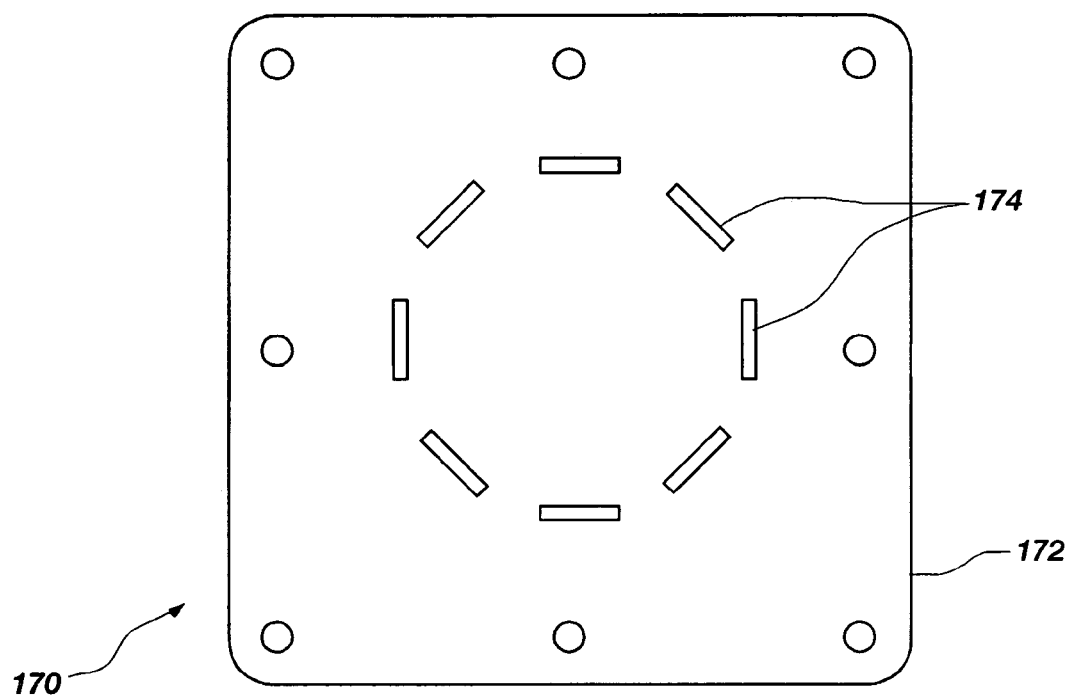
FIGS. 9A and 9B are plan and elevational views, respectively, of a base member that may be used with a deployable structural assembly in accordance with an aspect of the present invention.
Figure 9B:
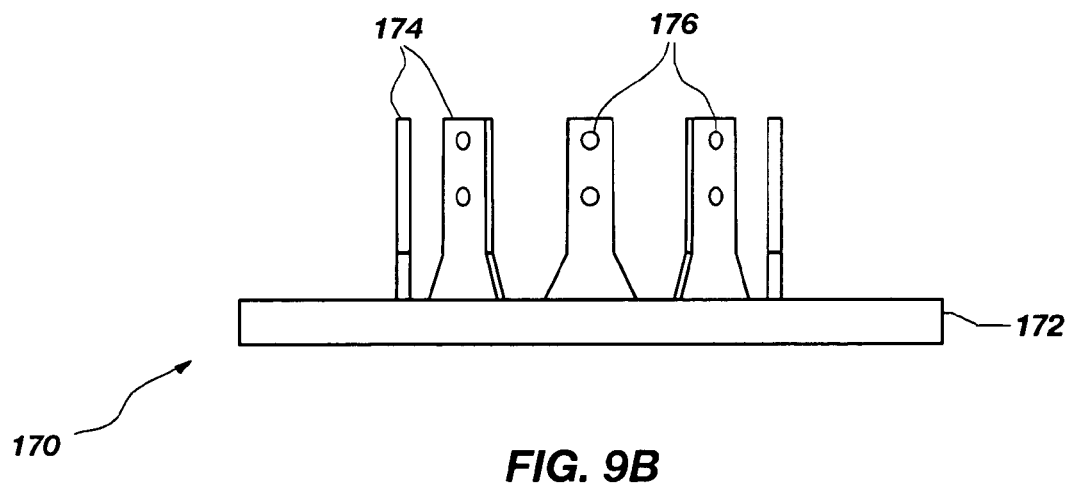

Referring to FIGS. 9A and 9B, a base 170 is shown which may be attached to another longitudinal end of the boom 100 (FIG. 1). The base 170 may include a plate member 172 having a plurality of boom engagement members 174 extending from the plate member 172 and configured for engagement with the structural components 102A and 102B of the boom 100 (FIG. 1). For example, the engagement members 174 may be configured to engage the longitudinal members 104 of the boom 100. As with the cap 160, the base 170 may be configured to engage the boom 100 by way of an interference fit (e.g., by way of an interfering dimension between the engagement members 174 and an internal periphery of the boom 100) or it may be configured to be coupled with the boom 100 by way of mechanical fasteners such as through fastener holes 176 formed in the engagement members 174 and corresponding fastener holes (not shown) in the boom 100. Such a base 170 may be used as a structural reinforcement member for the boom 100, for example, to provide additional radial rigidity at least at the longitudinal end of the boom 100 to which it is attached.

In another embodiment, while not shown, additional cross-supports may be added between the structural components 102A and 102B intermediate the ends of the boom 100 to prevent unwanted radial collapse or buckling of the boom 100 due to anticipated axial or radial loadings. Such cross-supports may be placed at defined longitudinal intervals and may be designed to maintain a substantially open-center framework that is provided by the boom 100 of the present invention.

Figure 10A:
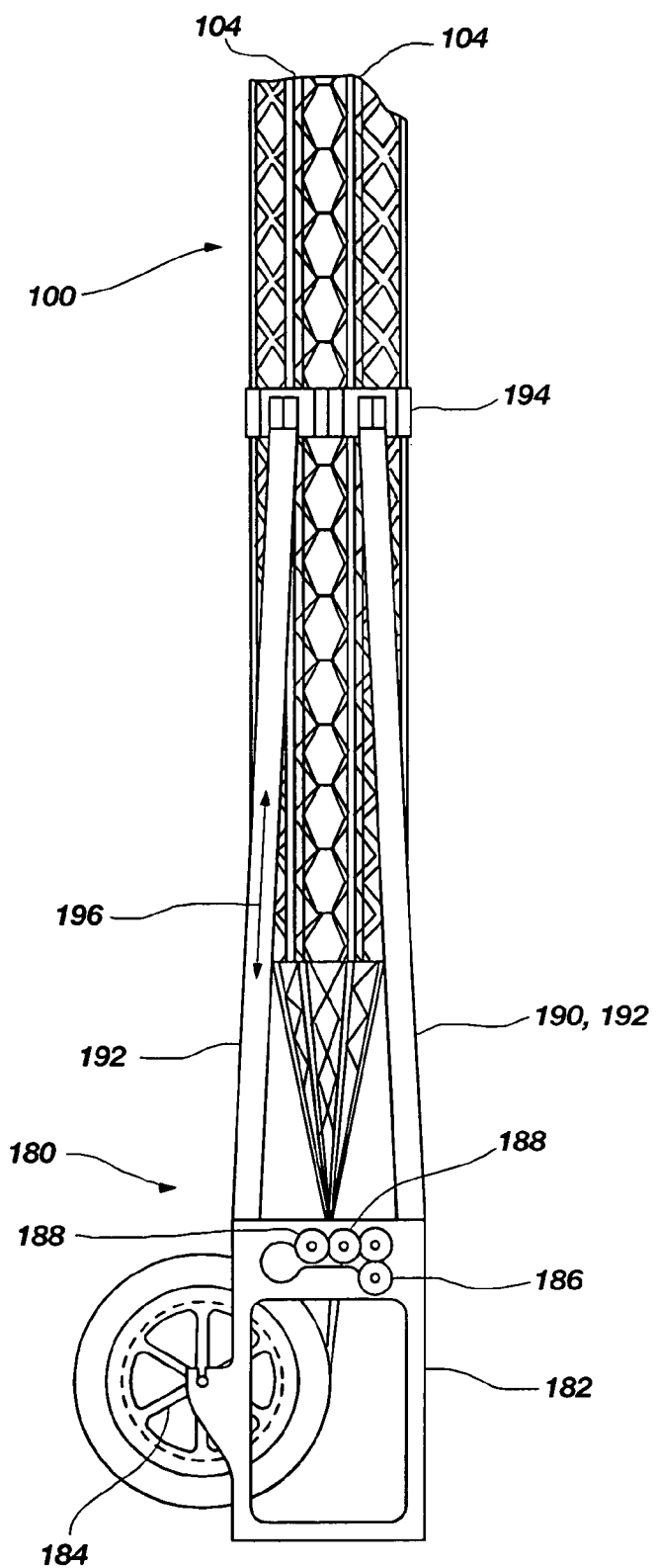
FIGS. 10A and 10B are elevational and perspective views, respectively, of a deployable structural assembly with an associated deployment mechanism in accordance with an embodiment of the present invention.
Figure 10B:
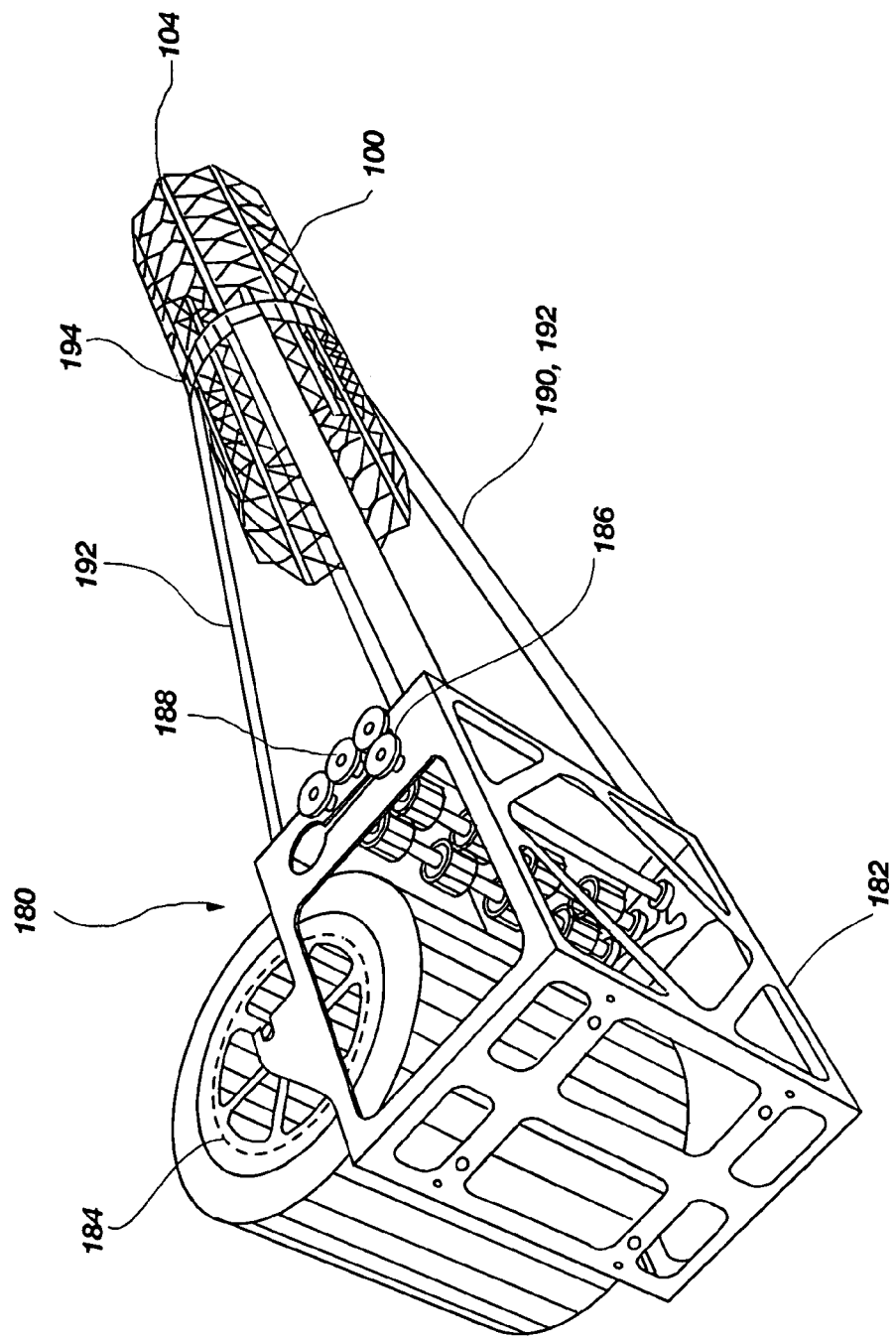

Referring now to FIGS. 10A and 10B, a boom 100 is shown in conjunction with a deployment mechanism 180. It is noted that only a portion of the boom 100 is shown in FIG. 10B for purposes of clarity in depicting the deployment mechanism 180 and an associated support mechanism 190. The deployment mechanism 180 may include a frame 182 having a roller mechanism 184 attached thereto for storing the boom 100 in a rolled or coiled state. A drive mechanism 186 may be operably coupled to drive rollers 188 which are configured to motivate the boom 100 between a stored state and a deployed state.

In one embodiment, the drive mechanism 186 may include a stored energy device such as a coiled spring having a clutch or a braking device to control the release of the stored energy. In other embodiments, a DC stepper motor with a gear head, an AC or a DC servo motor, or other drive mechanism may be used to control the positioning of the drive rollers 188. Use of a DC motor or a similar device provides the advantage of being able to control the rotational positioning of the drive rollers 188 including the direction and speed of rotation of the drive rollers 188. Thus, use of a DC motor or similar device allows the drive rollers 188 to be reversed in direction such that the structural components 102A and 102B (FIG. 1) may be retracted and coiled about the roller mechanism 184. The drive rollers 188 may be configured to frictionally engage the boom 100 or they may include engagement members (such as indexing pins) which physically engage corresponding indexing structures (such as notches or holes) formed in the longitudinal members 104 of the boom 100.

A support mechanism 190 may be used in conjunction with the deployment mechanism 180 to deploy and retract the boom 100 as well as to provide additional structural rigidity or stiffness to the deployed boom 100. For example, the support mechanism 190 may include a plurality of generally longitudinal structural supports 192 coupled to a radial support member 194 that is configured to surround a portion of the boom 100. The radial support member 194 may be configured to engage the boom 100 by way of sliding contact therewith so as to provide a structural support at the point(s) of contact. Thus, the support mechanism 190 provides support to an at least partially deployed boom 100 as well as to a boom that is in transition between a stored and a deployed state. In one embodiment, a lockable collar (not depicted) may be associated with the radial support member 194 to selectively engage the boom 100 and lock the boom in a longitudinal position, thereby providing structural support to the boom 100 while in a deployed or at least a partially deployed state.

In one embodiment, the support mechanism 190 may be adjustable so that the position of the radial support member 194 may be adjusted relative to the deployed length of the boom 100. For example, the longitudinal structural supports 192 may be deployable and retractable so as to displace the radial support member 194 a desired distance from the frame 182 of the deployment mechanism 180 as indicated generally by directional arrow 196 in FIG. 10A. Retraction of the support mechanism 190 enables more compact storage of the entire structure including the boom 100, the deployment mechanism 180 and the support mechanism 190.

Other features may also be included in the deployment mechanism 180. For example, a retraction mechanism, which may include a coiled spring, may be coupled to the roller mechanism 184 to assist in rolling the boom 100 back onto the roller mechanism 184 when it is desired to retract and store the boom 100. Additionally, various features may be associated with the drive mechanism 186 including various gearing, belts, chains and other power transmission mechanisms. Sensors (not depicted) may also be used to track the position of the boom 100 relative to the deployment mechanism 180. In other words, one or more sensors may be used to determine whether the boom 100 is fully deployed or fully retracted. Additionally, such sensors may be used to determine any position of the boom 100 between a fully deployed and fully retracted position. Such a sensor or sensors may include, for example, an optical encoder or an optical limit switch. Of course, other types of sensors may be used as will be appreciated by those of skill in the art.

Figure 10C:
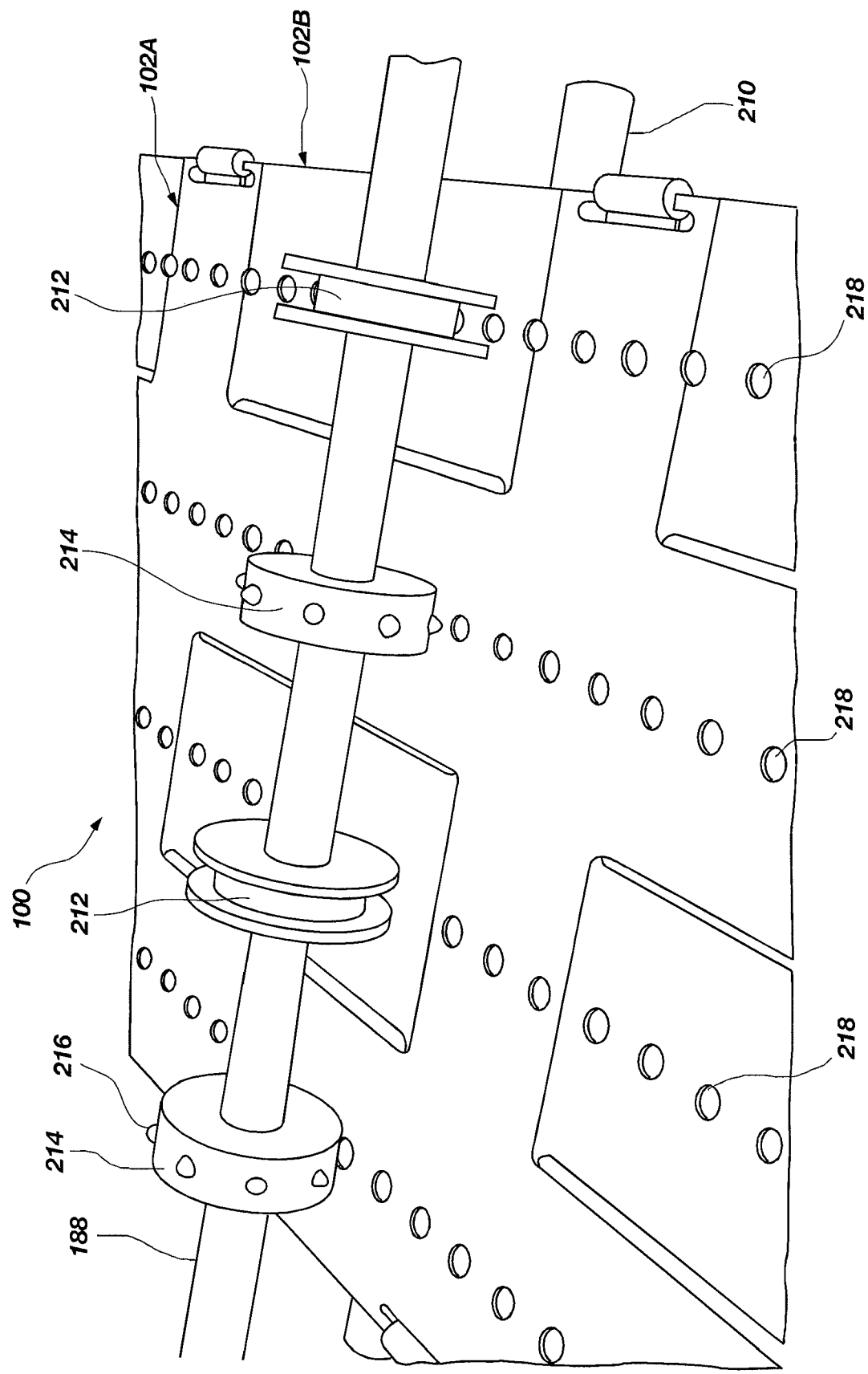
FIG. 10C is a perspective view of a deployable structural assembly engaged with a drive roller in accordance with an embodiment of the present invention.

Referring to FIG. 10C in conjunction with FIGS. 10A and 10B, different types of engagement members may be used by the deployment mechanism 180. For example, frictional engagement members 212, indexing engagement members 214, or both, may be used. The index pins 216 of the indexing engagement members 214 are sized and located to cooperatively engage with index holes 218 formed in the structural components 102A and 102B of the boom 100. It is noted that the index holes 218 may simply be holes directly formed in the material of the structural components 102A and 102B, or they may include reinforcement inserts formed of a material that will resist wear when engaged by the index pins 216. Such inserts may be formed of a material such as, for example, titanium.

As the drive roller 188 is rotated by the drive mechanism 186, the index pins 216 rotate into a corresponding index hole 218 and then motivate the boom 100 in a desired direction. In one embodiment, a frictional engagement member 212 of a passive roller 210 is positioned to press against the boom 100 opposite that of an indexing engagement member 214 to provide support and stability to the boom 100 during deployment and retraction. The frictional engagement members 212 may be formed of a relatively soft and pliable material, such as a foam or rubber-like material, or may include a structurally rigid member with a coating of such softer material.

Figure 11A:
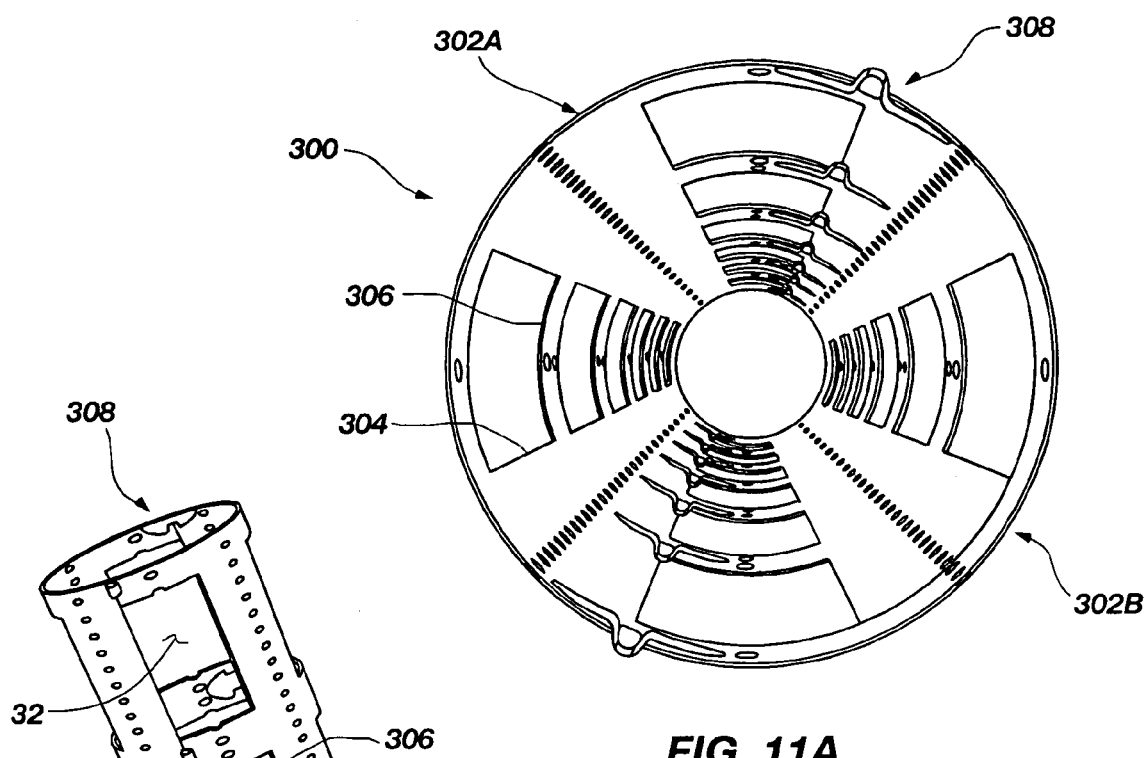
FIGS. 11A through 11C show various views of a deployable structural assembly in accordance with a further embodiment of the present invention.
Figure 11B:
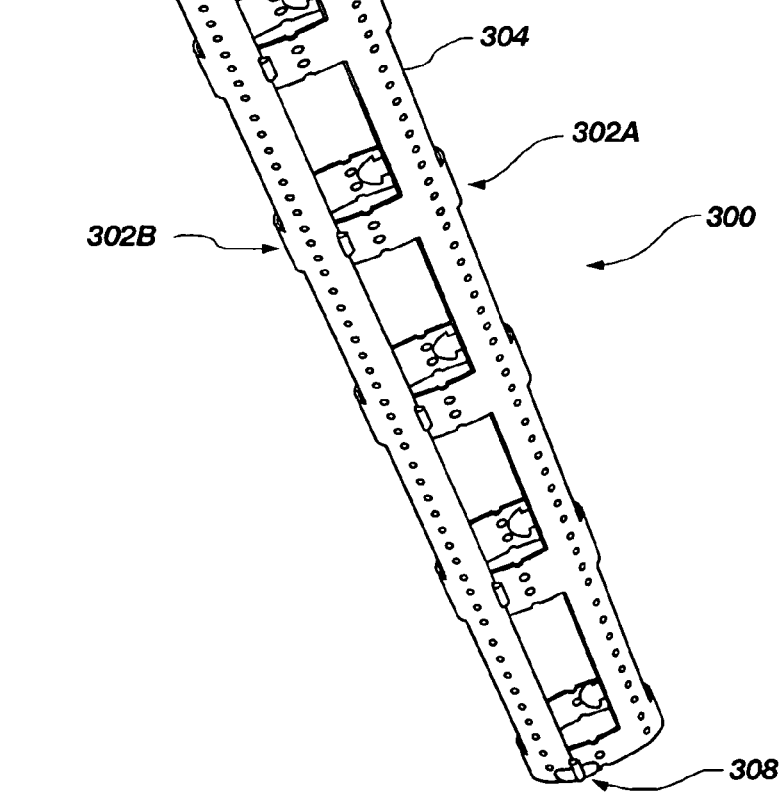
Figure 11C:
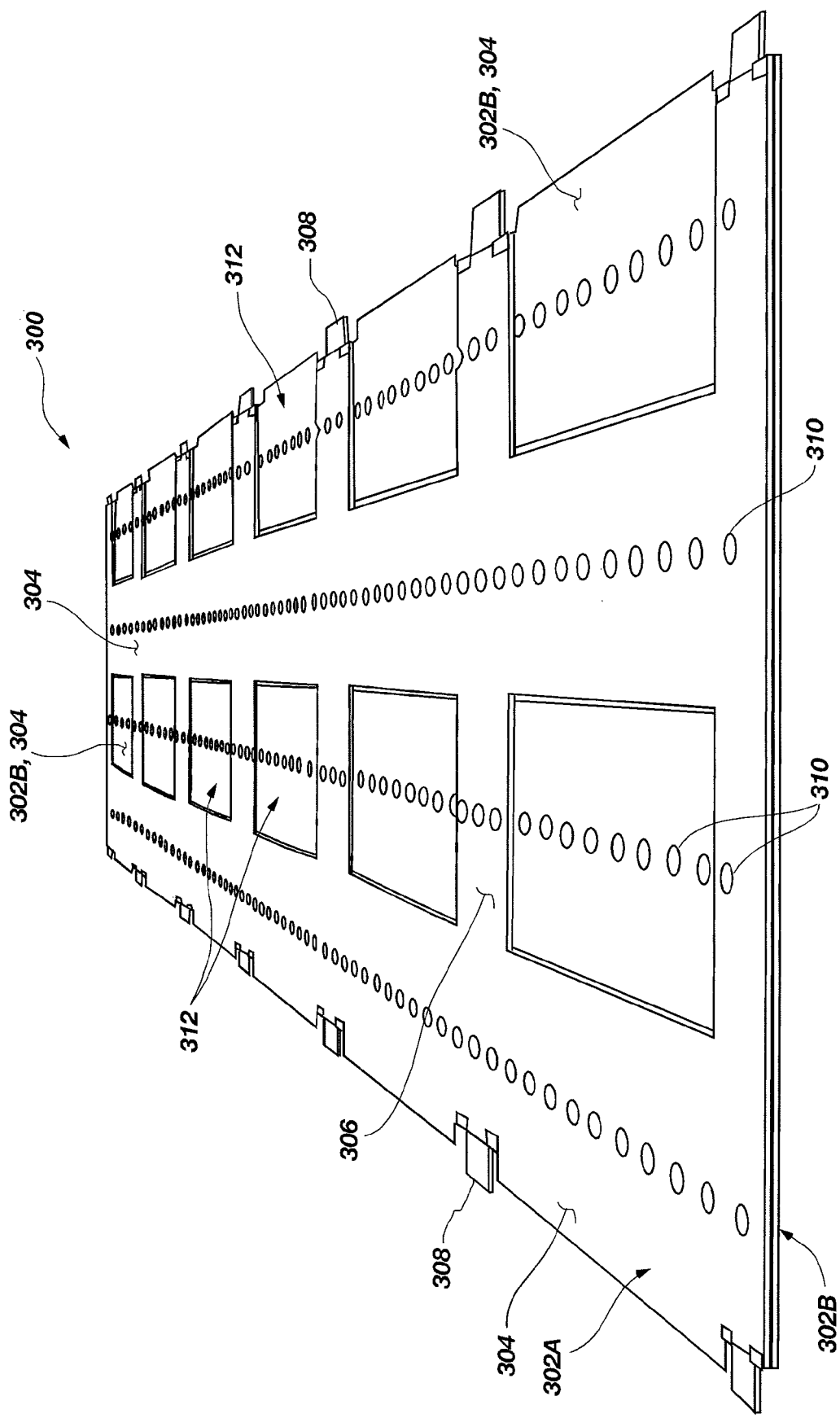

Referring briefly to FIGS. 11A-11C, another deployable structure, referred to as a boom 300, is shown. FIGS. 11A and 11B depict various views of the boom 300 while in a deployed state, while FIG. 11C depicts a perspective view of the boom 300 while in a collapsed (but not coiled) state. The boom 300 is formed of two or more structural components 302A and 302B. Each structural component 302A, 302B may include a plurality of longitudinal members 304, which may be referred to as longerons, spaced apart from one another and connected to one another by way of cross-members 306 or battens extending between and coupled with the longitudinal members 304 in a direction that is substantially transverse to the longitudinal members 304. The boom 300 may include a plurality of discrete flex joints 308 (which may include the foldable components described hereinabove) to enable the structural components 302A and 302B to fold or collapse relative to one another. Indexing holes 310 may be formed in longitudinal members 304, the cross-members 306 or battens, or both, to assist in deployment and retraction of the boom 300 by a deployment mechanism such as discussed hereinabove.

In the embodiment depicted in FIGS. 11A-11C, the boom 300 includes four longitudinal members 304 (two longitudinal members in each of the structural components 302A and 302B) and a plurality of cross-members 306 coupling the longitudinal members 304. Indexing holes 310 are formed in both the longitudinal members 304 and the cross-members 306 or battens such that, when in a collapsed state (FIG. 11C), the indexing holes 310 of the first structural component 302A align with the indexing holes 310 of the second structural component 302B.

The longitudinal members 304 and cross-members 306 collectively define a plurality of openings 312 within each of the structural components 302A, 302B. Moreover, the openings 312 are defined such that a substantial portion (e.g., a majority or greater) of the longitudinal members 304 of one structural component (e.g., 302B) is exposed through the openings 312 of the opposing structural component (e.g., 302A) when the boom 300 is in a collapsed state such as may be seen in FIG. 11C. Stated another way, the longitudinal members 304 of one structural component (e.g., 302A) are laterally offset relative to the longitudinal members 304 of the other structural component (e.g., 302B) when the boom 300 is in a collapsed state. As discussed hereinabove, when the boom 300 is collapsed and coiled, the laterally offset arrangement of the longitudinal members 304 of a first structural component 302A with respect to the longitudinal members 304 of the second structural component 302B enables the radially inner structural component (e.g., structural component 302A) to bulge out through the openings 312 defined in the adjacent radially outer structural component (e.g., structural component 302B) such that the longitudinal members 304 of the radially inner structural component need not be restrained to a tighter radius than that of the longitudinal members 304 of the radially outer structural component (e.g., 302B). The "bulging" of the longitudinal members 304 of radially inner structural components (e.g., 302A) enables the boom 300 to be stored in a more compact coil and with less potential energy being stored within the coiled boom 300.

In one example embodiment, the boom 300 may be configured such that it includes four total longitudinal members 304 (two longitudinal members 304 in each structural component 302A and 302B). Additionally, such a boom may exhibit an inner diameter of approximately 6.4 cm, a length of approximately 2.3 m, a wall thickness of approximately 0.33 mm and a linear density of approximately 64 g/m. Such a boom 300 will have a predicted bending stiffness of approximately 580 Nm$^2$ and a predicted maximum bending moment of approximately 15.3 Newton-meters (Nm).

Of course, such a configuration, including the dimensions set forth, is merely an example of a specific possible embodiment. The boom 300 may be configured with a different number of longitudinal members 304, exhibit different dimensions, and include various features of other embodiments described herein as will be appreciated by those of ordinary skill in the art.

Figure 12A:
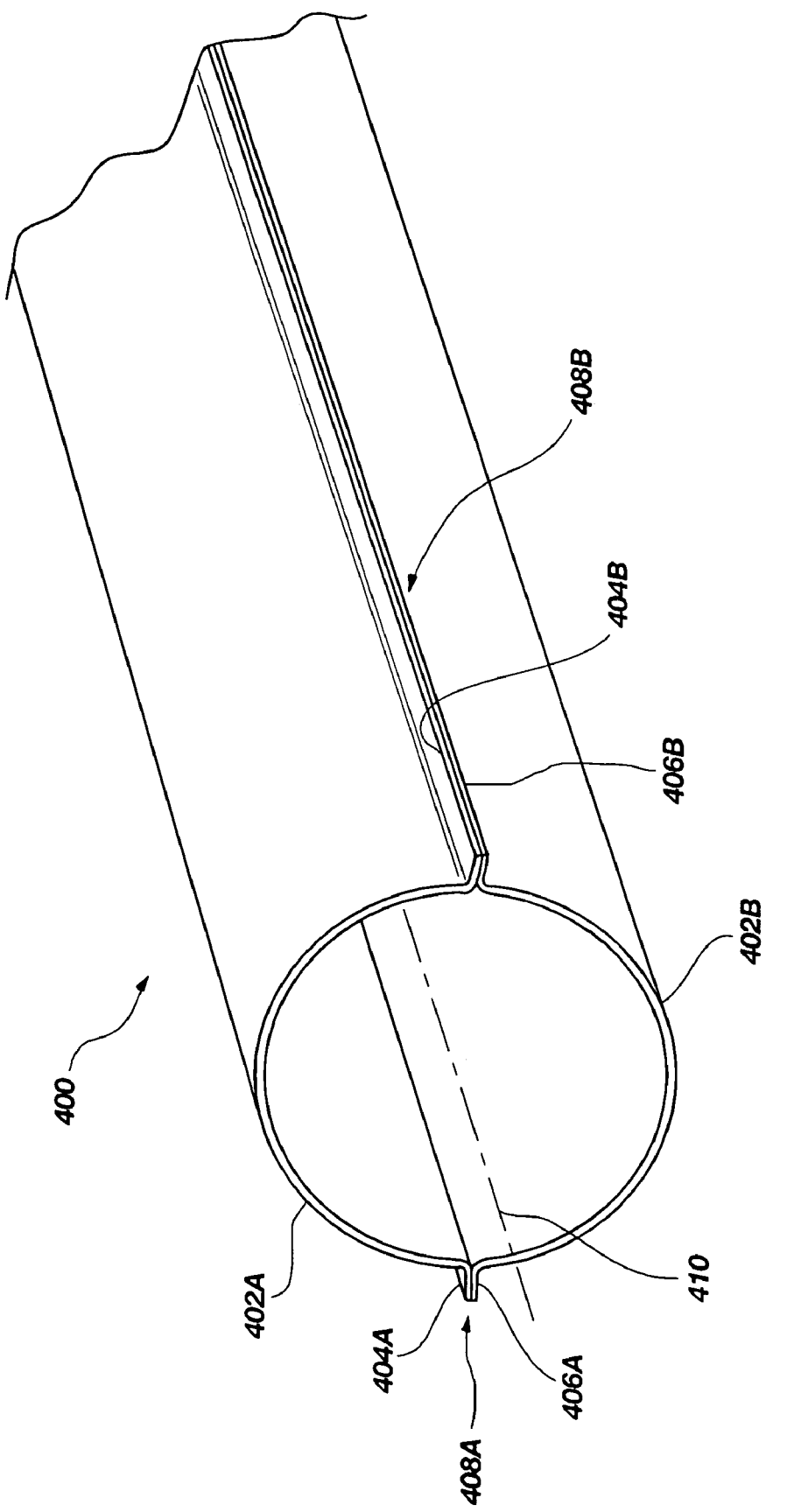
FIGS. 12A and 12B are perspective and elevational views, respectively, of a deployable structural assembly in accordance with another embodiment of the present invention.
Figure 12B:
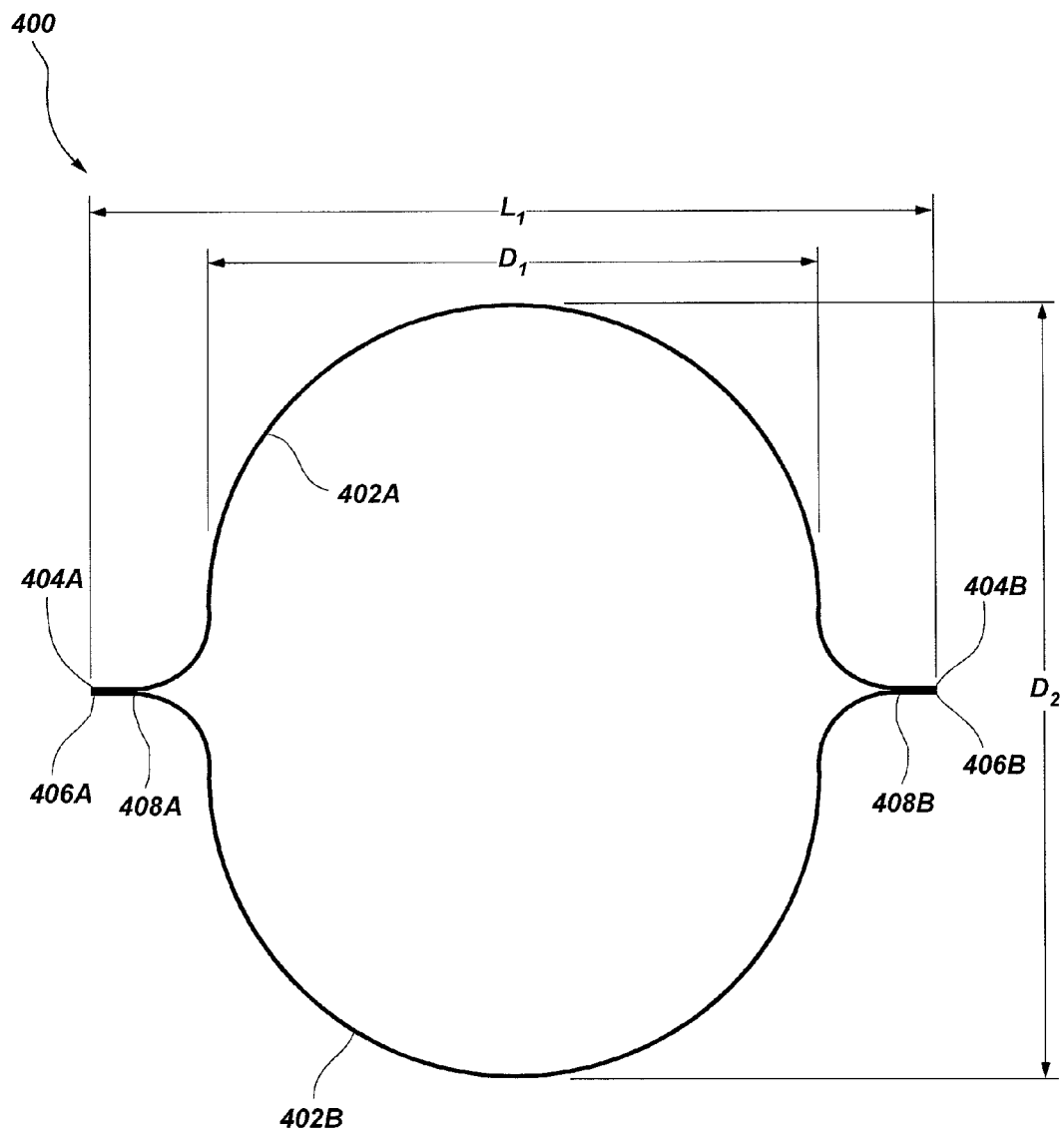

Referring now to FIGS. 12A and 12B, another embodiment of a deployable structure or boom 400 is shown. The boom 400 includes two or more structural components 402A and 402B, each being formed as a thin sheet of material. A first longitudinal edge 404A of one structural component 402A is bonded, adhered or otherwise coupled to a first longitudinal edge 406A of another structural component 402B forming a first seam or joint 408A. A second longitudinal edge 404B of one structural component 402A is bonded, adhered or otherwise coupled to a second longitudinal edge 406B of another structural component 402B to form a second seam or joint 408B. In one embodiment, the joints 408A and 408B may be continuous or substantially continuous. For example, in some applications, the boom 400 may be used for fluid conveyance in addition to, or instead of, being used for a structural member. In such a case, it would be desirable to have the joints 408A and 408B formed as a continuous seam providing a seal between the two structural components 402A and 402B.

The structural components 402A and 402B are configured to exhibit a curve about the longitudinal axis 410 of the boom 400 while the boom 400 is in a substantially relaxed or non-loaded state. However, the configuration of the boom 400 enables the structural components 402A and 402B to be flattened against each other and rolled or folded for compact storage of the boom 400 similar to the collapsed or stowed state of the boom 100 described hereinabove with respect to FIGS. 1 through 3A. The structural components 402A and 402B are desirably formed of materials that enable them to exhibit a high axial stiffness while also exhibiting low bending stiffness such that they are furlable about an axis that is substantially perpendicular to the longitudinal axis 410 of the boom 400. In other words, the structural components 402A and 402B must be able to withstand substantial axial loading while in the deployed condition and while also being capable of being repeatedly furled or rolled into a rolled member or otherwise folded for storing.

Referring more specifically to FIG. 12B, an exemplary embodiment of the boom 400 while in the deployed state may include a structure exhibiting a cross-sectional geometry (as taken substantially transverse to the longitudinal axis 410 of the boom 400) having a minor diameter $D_1$ of 3.0 in., an overall cross-sectional width W (including the joints 408A and 408B) of approximately 4.2 in., and a major diameter $D_2$ of approximately 3.7 in. When in a stowed state, the structural components 402A and 402B of such an exemplary embodiment flatten out against each other so as to exhibit a width (from the peripheral edge of one joint 408A to the peripheral edge of the other joint 208B) of approximately 6.3 in.

The booms of the present invention, such as shown in the exemplary embodiments described herein, may be used in conjunction with various systems and employed in numerous environments. For example, copending U.S. patent application Ser. No. 11/080,357 entitled, DEPLOYABLE STRUCTURAL ASSEMBLIES, SYSTEMS FOR DEPLOYING SUCH STRUCTURAL ASSEMBLIES AND RELATED METHODS, assigned to the assignee hereof, the disclosure of which is incorporated by reference in its entirety, describes numerous environments, systems and applications in which the presently described booms may be employed. Additionally, various other features described in U.S. patent application Ser. No. 11/080,357 are contemplated as being utilized with or incorporated into embodiments of the present invention.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A deployable structural assembly, comprising:
a first structural component having at least one longitudinal member, wherein the first structural component has a curved shape about a longitudinal axis of the first structural component when in a relaxed state and a substantially planar shape when in a stowed state;
a second structural component having at least one longitudinal member, wherein the second structural component has a curved shape about a longitudinal axis of the second structural component when in a relaxed state and a substantially planar shape when in a stowed state;
a first plurality of discrete flex joints coupling a first edge of the first structural component and a first edge of the second structural component, wherein at least one discrete flex joint of the first plurality of discrete flex joints circumferentially spaces the first structural component from the second structural component; and
a second plurality of discrete flex joints coupling a first edge of the second structural component and a second edge of the second structural component, wherein at least one discrete flex joint of the second plurality of discrete flex joints circumferentially spaces the first structural component from the second structural component.

2. The deployable structural assembly of claim 1, wherein at least one discrete flex joint of the first plurality of discrete flex joints and the second plurality of discrete flex joints includes a foldable metallic component bonded to a portion of the first structural component and bonded to a portion of the second structural component.

3. The deployable structural assembly of claim 2, wherein the foldable metallic component includes a first wing section, a first central section, a second wing section and a second central section, wherein the first wing section and the first central section define a first angle therebetween, the second wing section and the second central section define a second angle therebetween, and the first central section and the second central section define a third angle therebetween when the foldable metallic component is in a substantially unloaded state.

4. The deployable structural assembly of claim 3, wherein the foldable metallic component is formed of material comprising titanium.

5. The deployable structural assembly of claim 3, wherein the foldable metallic component is formed of a material which exhibits a thickness of approximately 0.005 of an inch.

6. The deployable structural assembly of claim 3, wherein the foldable metallic component further includes at least one tab coupled to the first wing section and at least one tab coupled to the second wing section.

7. The deployable structural assembly of claim 3, wherein the first wing section, the first central section, the second wing section and the second central section are configured as a unitary member.

8. The deployable structural assembly of claim 3, wherein the first central section and the second central section are welded to one another.

9. The deployable structural assembly of claim 1, wherein the first structural component and the second structural component are substantially identical to one another.

10. The deployable structural assembly of claim 1, wherein the first structural component and the second structural component each include at least one longitudinal member extending in a first direction.

11. The deployable structural assembly of claim 10, wherein the first structural component and the second structural component each include at least one diagonal member extending at an acute angle with respect to the at least one longitudinal member.

12. The deployable structural assembly of claim 11, wherein the at least one longitudinal member and the at least one diagonal member are formed as a unitary structure.

13. The deployable structural assembly of claim 10, wherein the first structural component and the second structural component each include at least one cross-member extending at a perpendicular angle with respect to the at least one longitudinal member.

14. The deployable structural assembly of claim 13, wherein the at least one longitudinal member and the at least one cross-member are formed as a unitary structure.

15. The deployable structural assembly of claim 10, wherein when the deployable structural assembly is in a stowed state, the first structural component is pressed against the second structural component and the at least one longitudinal member of the first structural component is offset relative to the at least one longitudinal member of the second structural component in a second direction substantially perpendicular to the first direction.

16. The deployable structural assembly of claim 15, wherein the first structural component and the second structural component are furlable about an axis substantially perpendicular to the first direction.

17. The deployable structural assembly of claim 1, wherein the first structural component and the second structural component each include a first layer of material comprising a fiber reinforced composite material.

18. The deployable structural assembly of claim 17, wherein the first structural component and the second structural component further include a second layer of material bonded to the first layer of material, the second layer of material comprising a different material than the first layer of material.

19. A deployable structural assembly configured to be selectively positioned in a deployed state and a stowed state, comprising:
a first structural component having at least one longitudinal member extending in a first direction, wherein the first structural component has a curved shape about a longitudinal axis of the first structural component when in a deployed state; and a second structural component having at least one longitudinal member extending in the first direction and hingedly coupled with the first structural component, wherein the second structural component has a curved shape about a longitudinal axis of the second structural component when in a deployed state, wherein when the deployable structural assembly is in a stowed state, a cross-sectional face of the first structural component at least partially abuts a cross-sectional face of the second structural component and the at least one longitudinal member of the first structural component is offset relative to the at least one longitudinal member of the second structural component in a direction substantially perpendicular to the first direction.

20. The deployable structural assembly of claim 19, wherein the first structural component and the second structural component are cooperatively configured to be coiled while in the stowed state about a defined axis that is substantially perpendicular to the first direction.

21. The deployable structural assembly of claim 20, wherein the at least one longitudinal member of the first structural component includes a plurality of longitudinal members, wherein the at least one longitudinal member of the second structural component includes a plurality of longitudinal members, and wherein the first structural component and the second structural component each include a plurality of cross-members coupled between the plurality of longitudinal members.

22. The deployable structural assembly of claim 21, wherein the first structural component and the second structural component are configured to define openings between their respective plurality of longitudinal members and plurality of cross-members.

23. The deployable structural assembly of claim 22, wherein when in a stowed state, the deployable structural assembly is coiled about an axis extending substantially perpendicular to the first direction and the plurality of longitudinal members of the first structural component bulge through the openings defined in the second structural component.

24. The deployable structural assembly of claim 21, wherein the plurality of longitudinal members of the first structural component and the plurality of cross members of the first structural component are formed as a unitary structure.

25. The deployable structural assembly of claim 19, wherein the first structural component and the second structural component each include a first layer of material comprising a fiber reinforced composite material.

26. The deployable structural assembly of claim 25, wherein the first structural component and the second structural component further include a second layer of material bonded to the first layer of material, the second layer of material comprising a different material than the first layer of material.

27. The deployable structural assembly of claim 19, wherein the first structural component and the second structural component are hingedly coupled by way of a metallic foldable component bonded to a portion of the first structural component and bonded to a portion of the second structural component.

28. The deployable structural assembly of claim 27, wherein the foldable metallic component is formed of material comprising titanium.

29. The deployable structural assembly of claim 19, wherein the at least one longitudinal member of the first structural component includes a plurality of longitudinal members and wherein the at least one longitudinal member of the second structural component includes a plurality of longitudinal members and wherein each longitudinal member of the first structural component is laterally offset to each longitudinal member of the second structural component along a direction of a defined axis while the deployable structural assembly is in a stowed state.

30. A method of forming a deployable structural assembly, the method comprising:

forming a first structural component having at least one longitudinal member and having a curved shape about a longitudinal axis of the first structural component when in a relaxed state;

forming a second structural component having at least one longitudinal member and having a curved shape about a longitudinal axis of the second structural component when in a relaxed state;

hingedly coupling a first longitudinal edge of the first structural component to a first longitudinal edge of the second structural component along an axis substantially parallel to the longitudinal axes of the first structural component and the second structural component;

hingedly coupling a second longitudinal edge of the first structural component to a second longitudinal edge of the second structural component along an axis substantially parallel to the longitudinal axes of the first structural component and the second structural component;

positioning the first structural component and the second structural component to be collapsed against each other and rolled about a defined axis substantially perpendicular to the longitudinal axes of the first structural component and the second structural component; and laterally offsetting the at least one longitudinal member of the first structural component relative to at least one longitudinal member of the second structural component in a direction along the defined axis.

31. An apparatus comprising:
a deployable structural assembly comprising:
  a first structural component having at least one longitudinal member, the first structural component having a curved shape about a longitudinal axis of the first structural component when in a relaxed state;
  a second structural component having at least one longitudinal member, the second structural component having a curved shape about a longitudinal axis of the second structural component when in a relaxed state;
  a first plurality of discrete flex joints coupling a first edge of the first structural component and a first edge of the second structural component; and
  a second plurality of discrete flex joints coupling a second edge of the first structural component and a second edge of the second structural component; and
a deployment mechanism, wherein the deployment mechanism is configured to deploy the deployable structural assembly from a coiled, stowed condition to a deployed, longitudinally extending condition, wherein in the stowed condition the first structural component is pressed against the second structural component.

32. An apparatus comprising:
a deployable structural assembly configured to be selectively positioned in a deployed state and a stowed state comprising:
  a first structural component having at least one longitudinal member extending in a first direction, the first structural component having a curved shape about a longitudinal axis of the first structural component when positioned in the deployed state; and a second structural component having at least one longitudinal member, the second structural component having a curved shape about a longitudinal axis of the second structural component when positioned in the deployed state, the second structural component being hingedly coupled with the first structural component, wherein when the deployable structural assembly is in a stowed state, the first structural component is pressed against the second structural component and the at least one longitudinal member of the first structural component is offset relative to the at least one longitudinal member of the second structural component in a direction substantially perpendicular to the first direction; and a deployment mechanism, wherein the deployment mechanism is configured to deploy the deployable structural assembly from a coiled, stowed condition to a deployed, longitudinally extending condition.

* * * * *

UNITED STATES PATENT AND TRADEMARK OFFICE
CERTIFICATE OF CORRECTION

PATENT NO.        : 7,694,465 B2                                                Page 1 of 1
APPLICATION NO.   : 11/400718
DATED             : April 13, 2010
INVENTOR(S)       : Mark K. Pryor It is certified that error appears in the above-identified patent and that said Letters Patent is hereby corrected as shown below:

On the title page:
In ITEM (56) References Cited
　　　OTHER PUBLICATIONS
　　　Page 2, 2$^{nd}$ column, 2$^{nd}$ line of the
　　　　4$^{th}$ entry (line 58),　　　　　　change "httn://" to --http://--

In the specification:
　　　　　COLUMN 3,　　LINE 62,　　　change "second structural" to --first structural--
　　　　　COLUMN 8,　　LINE 46,　　　change "inches" to --inch--
　　　　　COLUMN 9,　　LINE 57,　　　change "FIG. 3)." to --FIG. 3A).--

In the claims:
CLAIM 1,　COLUMN 15,　LINE 45,　　　change "first" to --second--
CLAIM 1,　COLUMN 15,　LINE 46,　　　change "second structural" to --first structural--
CLAIM 24, COLUMN 17,　LINE 46,　　　change "cross members" to --cross-members--

Signed and Sealed this
Ninth Day of July, 2013

Teresa Stanek Rea
*Acting Director of the United States Patent and Trademark Office*